United States Patent
Zhao et al.

(10) Patent No.: US 10,904,770 B2
(45) Date of Patent: Jan. 26, 2021

(54) ELECTRONIC APPARATUS AND METHOD FOR SPECTRUM MANAGEMENT DEVICE

(71) Applicant: Sony Corporation, Tokyo (JP)

(72) Inventors: Youping Zhao, Beijing (CN); Yiteng Wang, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/904,598

(22) Filed: Jun. 18, 2020

(65) Prior Publication Data

US 2020/0322810 A1 Oct. 8, 2020

Related U.S. Application Data

(63) Continuation of application No. 16/584,975, filed on Sep. 27, 2019, now Pat. No. 10,735,975, which is a continuation of application No. 15/841,407, filed on Dec. 14, 2017, now Pat. No. 10,470,051.

(30) Foreign Application Priority Data

Jan. 26, 2017 (CN) .......................... 2017 1 0061780

(51) Int. Cl.
*H04W 16/18* (2009.01)
*H04W 16/14* (2009.01)
*H04B 17/345* (2015.01)

(52) U.S. Cl.
CPC .......... *H04W 16/18* (2013.01); *H04W 16/14* (2013.01); *H04B 17/345* (2015.01)

(58) Field of Classification Search
CPC .......................... H04W 16/18; H04B 7/18563
See application file for complete search history.

(56) References Cited

U.S. PATENT DOCUMENTS

| | | | |
|---|---|---|---|
| 2010/0272038 A1* | 10/2010 | Hamalainen | H04W 16/14 370/329 |
| 2012/0282932 A1 | 11/2012 | Yu et al. | |
| 2015/0119014 A1 | 4/2015 | Muraoka et al. | |
| 2017/0188379 A1 | 6/2017 | Shtrom et al. | |
| 2018/0206128 A1* | 7/2018 | Perez | H04W 16/14 |

* cited by examiner

*Primary Examiner* — Myron Wyche
(74) *Attorney, Agent, or Firm* — Xsensus, LLP

(57) ABSTRACT

An electronic apparatus and a method for a spectrum management device are provided. The electronic apparatus includes processing circuitry configured to: acquire, for a predetermined primary system, an interference radiation map representing interference amounts of secondary systems at locations in a management region of the spectrum management device to the primary system; and determine an exclusion zone for the primary system based on the interference radiation map, where secondary systems in the exclusion zone cannot use a spectrum which is being used by the primary system.

20 Claims, 16 Drawing Sheets

ELECTRONIC APPARATUS AND METHOD FOR SPECTRUM MANAGEMENT DEVICE

CROSS-REFERENCE TO RELATED APPLICATIONS

The present application is a continuation of U.S. application Ser. No. 16/584,975, filed Sep. 27, 2019, which is a continuation of U.S. application Ser. No. 15/841,407, filed Dec. 14, 2017 (now U.S. Pat. No. 10,470,051), which claims priority to CN 201710061780.4, filed Jan. 26, 2017, the entire contents of each are incorporated herein by reference.

FIELD OF THE INVENTION

Embodiments of the present disclosure generally relate to the field of wireless communications, in particular to the spectrum management technology in a dynamic spectrum access system, and more particularly to an electronic apparatus and a method for a spectrum management device.

BACKGROUND OF THE INVENTION

With the development of the wireless communication technology, a user has an increasingly high service requirement for high quality, a high speed and a new service. Wireless communication operators and device providers need to improve a system continuously to meet the requirement of the user. It requires a great amount of spectrum resources to support new services appearing continuously and meet the requirement of high speed communications. The spectrum resource may be quantified by parameters such as time, frequency, bandwidth and allowable maximum emission power.

Presently, limited spectrum resources have been distributed to fixed operators and services, new available spectrum is rare or expensive. In this case, a concept of dynamically utilizing the spectrum is proposed, i.e., dynamically utilizing spectrum resources which have been distributed to some services but are not utilized sufficiently. For example, the Cognitive Radio (CR) technology is proposed, such that an unlicensed user dynamically accesses to a licensed spectrum under constraint of a certain rule, and actual utilization efficiency of the spectrum is improved significantly, thereby alleviating a problem of spectrum resources scarcity to a certain degree.

Multiple transceivers with a cognitive function and related management control units form a Dynamic Spectrum Access (DSA) system. In the dynamic spectrum access system, a secondary user can access to a spectrum of a primary user in the event that the secondary user does not impact the normal communication of the primary user, i.e., the secondary user has to ensure a service quality requirement of the primary user.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an electronic apparatus for a spectrum management device is provided, which includes processing circuitry configured to: acquire, for a predetermined primary system, an interference radiation map representing interference amounts of secondary systems at locations in a management region of the spectrum management device to the primary system; and determine, based on the interference radiation map, an exclusion zone for the primary system, wherein secondary systems in the exclusion zone are not capable of using a spectrum which is being used by the primary system.

According to another aspect of the present disclosure, an electronic apparatus for a spectrum management device is provided, which includes processing circuitry configured to: acquire, for a predetermined primary system, an interference radiation map representing interference amounts of secondary systems at locations in a management region of the spectrum management device to the primary system; and determine, based on information on a boundary of the exclusion zone acquired from another spectrum management device, an exclusion zone for the primary system, wherein the secondary systems in the exclusion zone are not capable of using a spectrum which is being used by the primary system, and the boundary of the exclusion zone is obtained by the another spectrum management device based on the interference radiation map of the spectrum management device.

According to another aspect of the present disclosure, a method for a spectrum management device is provided, which includes: acquiring, for a predetermined primary system, an interference radiation map representing interference amounts of secondary systems at locations in a management region of the spectrum management device to the primary system; and determining, based on the interference radiation map, an exclusion zone for the primary system, wherein secondary systems in the exclusion zone are not capable of using a spectrum which is being used by the primary system.

According to another aspect of the present disclosure, a method for a spectrum management device is provided, which includes: acquiring, for a predetermined primary system, an interference radiation map representing interference amounts of secondary systems at locations in a management region of the spectrum management device to the primary system; and determining, based on information on a boundary of the exclusion zone acquired from another spectrum management device, an exclusion zone for the primary system, wherein the secondary systems in the exclusion zone are not capable of using a spectrum which is being used by the primary system, and the boundary of the exclusion zone is obtained by the another spectrum management device based on the interference radiation map of the spectrum management device.

According to another aspect of the present disclosure, an electronic apparatus for a wireless communication device is provided, which includes: a measuring unit, configured to measure a power of a signal received from a primary system; and a determining unit, configured to determine, based on the measured power, information on an interference amount of the wireless communication device to the primary system in the case of a predetermined emitting power and predetermined antenna parameters, the information being provided to a management apparatus managing a plurality of secondary systems and being used by the management apparatus to determine an exclusion zone for the primary system.

According to other aspects of the present disclosure, there are also provided computer program codes and computer program products for implementing the above mentioned methods and a computer readable storage medium in which computer program codes for implementing the above methods are recorded.

With the electronic apparatus and method according to the present disclosure, the exclusion zone for the primary system is determined based on the interference radiation map, so that an exclusion zone with an irregular shape can be obtained and the number of secondary systems allowed to be accessed is increased effectively, thereby improving spectrum utilization efficiency while ensuring a communication quality of the primary system.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1A:
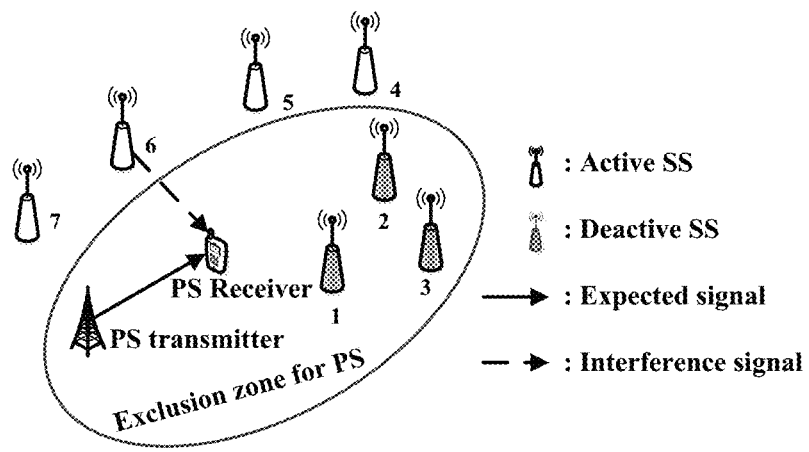
FIG. 1a and FIG. 1b respectively show a diagram of a scenario of coexistence of a single spectrum management device and a primary system and a diagram of a scenario of coexistence of multiple spectrum management devices and the primary system.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

In a dynamic spectrum access system, a wireless communication system authorized to use a spectrum is referred as a Primary System (PS), which is also referred as a Primary User (PU) herein. The primary system may include a transceiver and a related management unit. An unlicensed wireless communication system dynamically accessed to the spectrum according to a certain rule is referred as a Secondary System (SS), which is also referred as a Secondary User (SU) herein. A unit providing operations such as authentication, permission and spectrum usage management for the secondary system is referred as a Spectrum Access System (SAS). The SAS may be implemented as a spectrum management device for example. It should be understood that, the terms defined above are not intended to be limiting, and different terms may be used to indicate the primary system, the secondary system and the spectrum management device in different occasions or environments. It should be understood by those skilled in the art that the terms may also adapt to the technology of the present disclosure set forth hereinafter.

The wireless communication system described herein may be a communication system including a transmitting terminal and a receiving terminal, a communication system including a network control terminal such as a base station and a network node such as a user equipment, or a communication pairing (D2D), an internet of things and an environment monitoring system including multiple terminals, or the like. In other words, the wireless communication system may be a system including a transmitting party and a receiving party performing data transmission by occupying certain wireless spectrum resources.

For the primary system, it is authorized to use certain wireless spectrum resources, i.e., having the highest priority level for using the wireless spectrum resources. For the secondary system, it may use the wireless spectrum resources on the premise that a service quality requirement of the primary system is met, which may be implemented by the spectrum management device for example. For the same primary system, one spectrum management device may be provided to manage the secondary systems, or multiple spectrum management devices may be provided and each of the multiple spectrum management devices manages a part of the secondary systems.

Figure 1B:
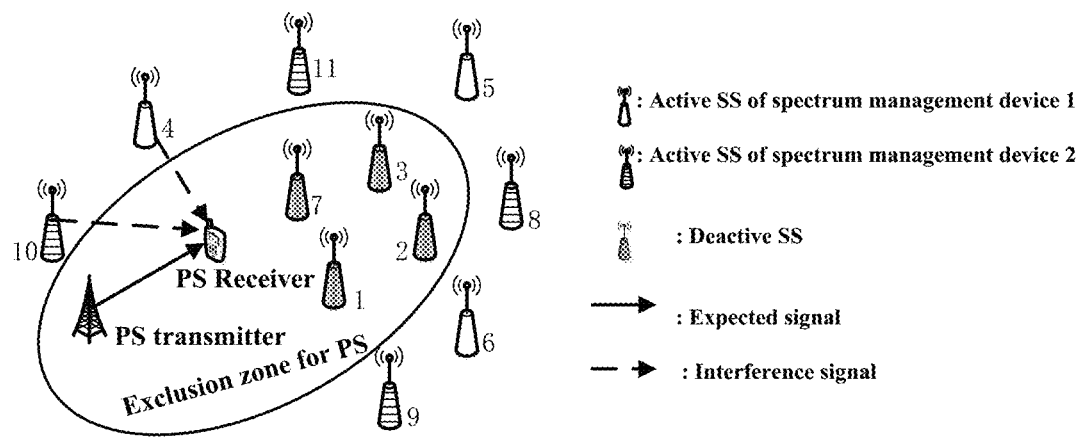

FIG. 1a and FIG. 1b respectively show a scenario of coexistence of a single spectrum management device and a primary system and a scenario of coexistence of multiple spectrum management devices and the primary system. In FIG. 1a, all secondary systems interfering with the primary system are controlled by the same spectrum management device. In FIG. 1b, the secondary systems interfering with the primary system are controlled by different spectrum management devices 1 and 2.

In addition, in FIG. 1a and FIG. 1b, in order to meet a service quality requirement of the primary system, a primary system exclusion zone (as shown by an ellipse) is provided. Secondary systems in the primary system exclusion zone are prohibited to use the licensed spectrum of the primary system, and secondary systems outside of the primary system exclusion zone may use the licensed spectrum. By constructing the primary system exclusion zone reasonably, accumulated interferences of the secondary systems to the primary system can be controlled within a certain range, thereby effectively ensuring the service quality requirement of the primary system.

It should be understood that, if the primary system exclusion zone is set to be too large, more secondary systems are excluded, thereby resulting in low spectrum utilization efficiency; and if the primary system exclusion zone is set to be too small, it is difficult to ensure the service quality requirement of the primary system.

Therefore, a technology for setting an exclusion zone for the primary system is provided according to the present disclosure. It should be understood that, although it is described with respect to the primary system exclusion zone in the following, the technology may be applied to the following case. Communication systems with different priority levels share certain predetermined spectrum resources, and an exclusion zone may be set for a communication system with a high priority level to ensure a service quality requirement thereof. In this case, the technology according to the present disclosure is also applicable, as long as the primary system is replaced with the communication system with the high priority level and the secondary system is replaced with a communication system with a low priority level. Priority levels of the communication systems may be determined according to application types, for example. For example, a high priority level may be assigned to a communication system for emergency use.

First Embodiment

Figure 2:
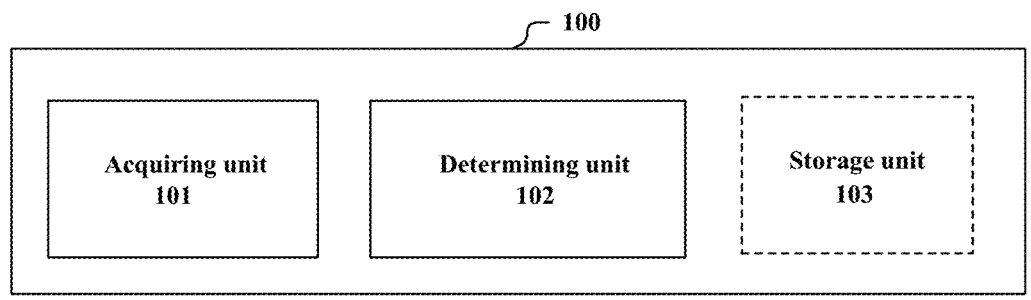
FIG. 2 is a block diagram showing functional modules of an electronic apparatus 100 for a spectrum management device according to an embodiment of the present disclosure.

FIG. 2 shows a block diagram of functional modules of an electronic apparatus 100 for a spectrum management device according to an embodiment of the present disclosure. The electronic apparatus 100 includes: an acquiring unit 101, configured to acquire, for a predetermined primary system, an interference radiation map representing interference amounts of secondary systems at locations in a management region of the spectrum management device to the primary system; and a determining unit 102, configured to determine an exclusion zone for the primary system based on the interference radiation map. Secondary systems in the exclusion zone cannot use a spectrum which is being used by the primary system.

The acquiring unit 101 and the determining unit 102 may be implemented by one or more processing circuits. The processing circuits may be implemented as a chip for example.

In an example, the acquiring unit 101 may acquire the interference radiation map based on measurement results of a signal of the primary system measured by multiple sensors arranged in a management region in advance and/or a secondary system apparatus in the management region. In the example, it is assumed that a transmitter and a receiver of the primary system are located at the same location and channels have reciprocity. In this way, by arranging sensors at different locations in the management region, the conditions of a channel between a location where the sensor is located and the receiver may be estimated based on the conditions of a channel between the transmitter and the location where the sensor is located. Alternatively, a secondary system apparatus such as a base station or a user equipment may be used to replace the sensor or function as supplementary of the sensor. By the way of sensing, operation parameters and environmental characteristics of the primary system can be reflected comprehensively, thereby constructing the interference radiation map more accurately.

Figure 3:
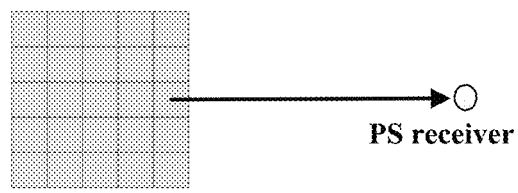
FIG. 3 is a schematic diagram showing that a management region is divided into multiple identical grid regions.

For example, the management region may be divided into multiple identical grid regions, and the sensor or the secondary system apparatus is arranged at a center of the grid region, as shown in FIG. 3. Division accuracy for the grid, i.e., a side length of the grid, may be determined by various methods. For example, the division accuracy may be adjusted according to a density of the secondary systems (k). The higher the density of the secondary systems is, the higher the division accuracy is, i.e., the smaller the side length is. It is assumed that the side length of the grid is r (m) and the density of the secondary systems is k (the number of the secondary systems/m²), an example of a method for determining the side length of the grid is given by the following equation (1). According to the equation (1), the number of the girds in a unit area is greater than or equal to the number of the secondary systems in the unit area.

$$r \leq 1/\sqrt{k} \qquad (1).$$

It should be understood that, the division manner and the division accuracy for the grid are not limited to the above examples and may be set appropriately according to applications.

In addition, in the case that the number of the sensors is not enough, the sensors may be moved to traverse centers of multiple grid regions.

The sensor or the secondary system apparatus measures a signal received from the primary system, and the sensor or the secondary system apparatus may provide a power of the signal to the acquiring unit 101, for example. The acquiring unit 101 may be configured to: calculate, based on the measurement result, a path loss from a location corresponding to the sensor or the secondary system apparatus to the primary system; and calculate an interference amount of the secondary system at the location to the primary system based on the path pass.

An emission power of the primary system is also to be known in the case of calculating the path loss. Alternatively, the path loss may be calculated by the sensor or the secondary system apparatus according to the following equation (2).

$$PL_{(x,y)} = 10 \log_{10}[P_t/P_{r(x,y)}] \qquad (2)$$

In which, a power of a signal of the primary system measured at coordinates (x, y) is $P_{r(x,y)}$, and its unit is W. It is known that the emission power of the transmitter of the primary system is $P_t$, and its unit is W.

As such, in the case that the path losses from multiple locations in the management region to a receiver of the primary system are estimated, if the emission powers and antenna parameters of secondary systems at corresponding locations are known, interference amounts of the secondary systems at the locations to the receiver of the primary system may be estimated. A correspondence between the interference amounts and the locations forms the interference radiation map.

For example, it is assumed that the sensors or the secondary system apparatus at the locations adopt an equal emission power and the same antenna configuration such as an omnidirectional antenna, an equal antenna height, an equal antenna gain and the like, interference intensity values of the secondary systems at the locations to the primary system may be indicated by the following equation (3) in conjunction with an antenna gain of the receiver of the primary system:

$$I_{(x,y)} = P_{t(x,y)} + G_{t(x,y)} - PL_{(x,y)} + G_{r(x,y)} \qquad (3).$$

In which, $I_{(x,y)}$ indicates interference of a secondary system at coordinates (x, y) to the primary system, and its unit is dB; $P_{t(x,y)}$ indicates the emission power at coordinates (x, y), and its unit is dB; $G_{t(x, y)}$ indicates an antenna gain of a sensor at coordinates (x, y) in a direction where the primary system is located, and its unit is dB; $PL_{(x, y)}$ indicates a path loss between a location corresponding to coordinates (x, y) and the primary system, and its unit is dB; $G_{r(x, y)}$ indicates an antenna gain of the primary system in a direction where the coordinates (x, y) are located, and its unit is dB. If the primary system antenna is in a specific direction, antenna gains in different directions are different. In the case that the $PL_{(x, y)}$ is obtained by the measurement (or sensing) mechanism above, the parameter indicates a synthesized result of the path loss and the primary system antenna gain and it is not necessary to add $G_{r(x, y)}$ in the equation (3). On the other hand, in the case that the $PL_{(x, y)}$ is calculated according to a propagation model, it is necessary to add $G_{r(x, y)}$ in the equation (3); and $G_{r(x, y)}$ may be ignored if the secondary system cannot acquire information on the primary system antenna gain.

Accordingly, the interference radiation map may further include operation parameter information of the sensor or the secondary system apparatus used when calculating the interference amount, such as the emission power, antenna parameters and the like, so that an acquisition condition for the interference radiation map can be known during subsequent use.

Figure 4:
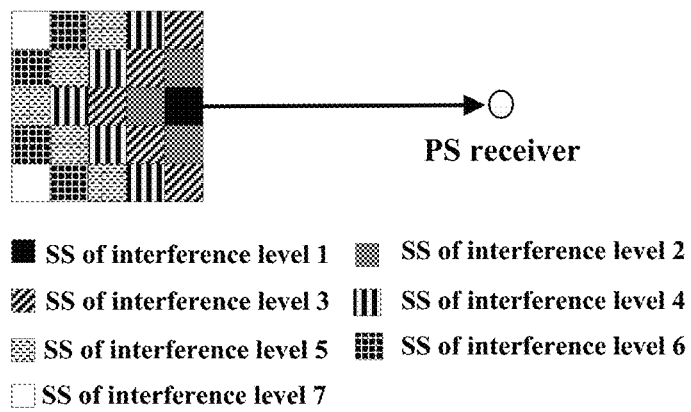
FIG. 4 is a schematic diagram showing an example of an obtained interference radiation map.

FIG. 4 shows a schematic diagram of an example of the obtained interference radiation map. In which, each interference level represents a corresponding interference amount range. If interference of a secondary system to the primary system falls within the interference amount range, it is considered that the secondary system is a secondary system with the interference level. In the example shown in FIG. 4, the small a level number is, the more serious the interference on the primary system is. It can be seen that, a secondary system further away from the receiver of the primary system produces less interference since the interference discussed herein is related to the path loss. It should be understood that, this is only exemplary, and the acquired interference radiation map is not limited thereto. For example, during an actual measurement, there are different channel conditions such as building blocking, and thus different interference radiation maps may be obtained.

As described above, the interference radiation map is related to a location and parameters of the primary system, i.e., each interference radiation map is obtained for a specific primary system. Therefore, in the case that there are multiple primary systems, each of the primary systems corresponds to one interference radiation map.

In the case that accuracy of the obtained interference radiation map is not enough, the acquiring unit 101 may be further configured to perform spatial interpolation on the interference radiation map to obtain an interference radiation map with a finer granularity. The interpolation may be performed by using various existing spatial interpolation algorithms, such as a Kriging algorithm.

In another aspect, in the case that the transmitter and the receiver of the primary system are located at different locations, the channels do not have reciprocity, or no sensor or secondary system apparatus for sensing is provided in the management region, the acquiring unit 101 may acquire the interference radiation map based on a wireless channel propagation model. Specifically, the acquiring unit may select, based on location information and known wireless environmental information, an appropriate wireless channel propagation model between each grid center and the primary system, to calculate path losses from respective locations to the primary system, and further obtain interference intensity values of secondary systems at the respective locations to the primary system.

In other examples, the acquiring unit 101 may acquire at least a part of the interference radiation map from another spectrum management device. For example, in the case that a management region of the spectrum management device is the same as or overlaps with a management region of another spectrum management device, the acquiring unit 101 may acquire an interference radiation map for the overlapped management region from another spectrum management device. If only an interference radiation map for a part of the management region of the spectrum management device is acquired, the acquiring unit 101 may further obtain a complete interference radiation map for the whole management region by the above manners, such as arranging the sensors or the secondary system apparatus, calculating according to the wireless channel propagation model, interpolating based on the existing data or the like.

The spectrum management device may maintain interference radiation maps for respective primary systems, to facilitate subsequent use. As shown by a dotted line box in FIG. 2, the electronic apparatus 100 may further include: a storage unit 103, configured to store an identifier of the primary system and an interference radiation map of the primary system in an associated manner. The storage unit 103 may be implemented by one or more memories, for example.

Upon the acquiring unit 101 acquires the interference radiation map, the determining unit 102 may determine an exclusion zone for the primary system using the interference radiation map in the condition of meeting an interference exclusion requirement of the primary system, so that an accumulated interference amount of secondary systems outside of the exclusion zone to the primary system just does not exceed a maximum accumulated interference amount allowable by the primary system. In the case of being subjected to the maximum accumulated interference, the primary system can just maintain its expected service quality.

As described above, the interference radiation map is determined based on the assumption of the equal emission power and the same antenna configuration. Practically, secondary systems in an active state may use different emission powers or different antenna configurations such as different antenna heights, different antenna orientations and different antenna gains. Therefore, in order to obtain an accurate interference conditions on the primary system, the determining unit 102 may be configured to correct, with system parameters of the secondary systems in the active state, interference amounts at locations corresponding to the secondary systems in the interference radiation map, to obtain an interference intensity map; and determine an exclusion zone based on the interference intensity map. The system parameters include a location, an emission power, antenna parameters and so on, for example. The exclusion zone may be determined based on a boundary of the exclusion zone, for example. The following equation (4) shows a corrected interference intensity value.

$$I'_{(x,y)} = P'_{t(x,y)} + G'_{t(x,y)} - PL_{(x,y)} + G_{r(x,y)} \quad (4)$$

In which, $I'_{(x,y)}$ indicates corrected interference of an actual secondary system at coordinates (x, y) to the primary system, and its unit is dB; $P'_{t(x,y)}$ indicates an emission power of the actual secondary system at coordinates (x, y), and its unit is dB; $G'_{t(x,y)}$ indicates an antenna gain of the actual secondary system at coordinates (x, y) in a direction where the primary system is located, and its unit is dB. In addition, similar to the equation (3), in the case that the $PL_{(x, y)}$ is obtained according to the sensing mechanism such as according to the equation (2), it is not necessary to add $G_{r(x, y)}$ in the equation (4). On the contrary, in the case that the $PL_{(x, y)}$ is calculated according to a propagation model, it is necessary to add $G_{r(x, y)}$ in the equation (4); and the $G_{r(x, y)}$ may be ignored if the secondary system cannot acquire information on the primary system antenna gain.

Therefore, as compared with the equation (3), the interference amounts in the interference radiation map may be corrected by using a difference between the emission power of the actual secondary system and the emission power used for generating the interference radiation map and a difference between the antenna gain of the actual secondary system in the direction where the primary system is located and the antenna gain in the direction where the primary system is located used for generating the interference radiation map. This correction calculation is simple, and a calculation load is reduced as compared with a manner of measuring or calculating the interference amount directly.

In an example, the determining unit 102 is configured to: accumulate, based on the interference intensity map, interference amounts generated by the secondary systems in the active state in an ascending order of the interference amounts, so that the accumulated interference amount does not exceed a maximum accumulated interference amount allowable by the primary system and the number of the secondary systems of which the interference amounts are accumulated is as large as possible; and determine a boundary of the exclusion zone based on a maximum interference amount among the interference amounts being accumulated. The maximum accumulated interference allowable by the primary system may be obtained based on multiple parameters, such as an interference threshold, an interference to noise ratio (INR) threshold, and a signal and interference to noise ratio (SINR) threshold. In the case of using the interference threshold, the allowable maximum accumulated interference amount is the interference threshold value. In the case of using the interference to noise ratio threshold and it is assumed that the interference to noise ratio threshold is a dB and a power of the noise is b dB, the allowable maximum accumulated interference amount is (a+b) dB. It should be understood that all of these are not limitations.

For example, the boundary of the exclusion zone may be defined based on the interference amount. In particular, the determining unit 102 may be configured to determine the maximum interference amount or an interference level corresponding to the maximum interference amount as the boundary of the exclusion zone. A secondary system of which the interference amount exceeds the boundary is determined to be in the exclusion zone. The boundary $IR_{th}$ of the exclusion zone is calculated using the interference amounts $I'_{(x,y)}$ of the secondary systems in the active state in the interference intensity map to the primary system, as shown by the following equation (5):

$$I_{agg} = 10\log_{10}\left[\sum_{(x,y)\in Z_{out}} 10^{(I'_{(x,y)}/10)}\right] \le I_{th}, I'_{(x,y)} \le IR_{th} \quad (5)$$

In which, $I_{agg}$ indicates the accumulated interference of the secondary systems to the primary system, and its unit is dB; $Z_{out}$ indicates outside of the exclusion zone for the primary system, and $I_{th}$ indicates a maximum accumulated interference amount allowable by the primary system.

According to the equation (5), it is ensured that the accumulated interference $I_{agg}$ of the secondary systems having interference amounts less than the boundary $IR_{th}$ of the exclusion zone does not exceed $I_{th}$.

Taking the scenario shown in FIG. 1a as an example, it is assumed that there are seven secondary systems coexisting with the primary system in the management region of the spectrum management device, and numbers of the secondary systems are shown in FIG. 1a. It is assumed that the maximum accumulated interference allowable by the primary system is 20 W, and harmful interference amounts of the seven secondary systems ($SS_1$ to $SS_7$) to the primary system are 20 W, 15 W, 15 W, 5 W, 5 W, 4 W and 2 W respectively, by referring to the interference intensity map. It is accumulated from the interference amount with the lowest level in sequence until the accumulated interference just does not exceed 20 W, for example 2 W+4 W+5 W+5 W<20 W, but 2 W+4 W+5 W+5 W+15 W+15 W>20 W, and thus the boundary of the exclusion zone is set to be an interference amount of 5 W. Therefore, $SS_4$ to $SS_7$ are outside of the exclusion zone for the primary system and can access to the spectrum of the primary system; and $SS_1$ to $SS_3$ are inside the exclusion zone for the primary system and cannot access to the spectrum of the primary system.

With the above manner, an exclusion zone boundary which is discrete spatially can be obtained; and spectrum utilization efficiency can be improved while ensuring a communication quality of the primary system, as compared with a circular exclusion zone.

In addition, the boundary of the exclusion zone may also be defined spatially. For example, the determining unit 102 may be further configured to determine a connecting line of locations of a maximum interference amount or an interference level corresponding to the maximum interference amount in the interference intensity map as the boundary of the exclusion zone. A secondary system of which a geographical location is within the boundary is determined to be in the exclusion zone. For example, as shown in FIG. 4, it is assumed that the calculated interference level corresponding to the maximum interference amount is 3, center points of grids having an interference level 3 are connected and the connecting line is determined as the boundary of the exclusion zone. This is because that, generally the interference of the secondary system to the primary system reduces with the increase of a distance between the secondary system and the primary system. This means that an interference amount of a secondary system at a location outside of the exclusion zone is less than the maximum interference amount, and thus the secondary system may use the spectrum of the primary system. Differences of the interference amounts in different directions are considered in the manner, and an exclusion zone with an irregular shape can be obtained. As compared with the circular exclusion zone, the exclusion zone is generally smaller, thereby improving the spectrum utilization efficiency while ensuring the communication quality of the primary system.

In the above example, the secondary systems are ranked in an ascending order of the generated interference amounts. During the process of ranking, the secondary systems may be distinguished according to different factors, for example by weighting interference amounts of at least a part of the secondary systems. For example, the weighting may be performed according to one or more of the following factors: a priority level of the secondary system and a payment status of the secondary system. In the case that the secondary system has a high priority level or is a payment user, the generated interference amount may be reduced by weighting, such as multiplying by a weighting coefficient smaller than 1, so as to improve a probability of being allowed to use the spectrum. It should be noted that, un-weighted interference amounts are still to be used when the accumulated interference to the primary system is calculated by using the equation (5), and the weighted interference amounts are only used for ranking.

As described above, there is a correspondence between the interference radiation map and the primary system. In the case that a location of the primary system changes, the interference radiation map corresponding to the original location is not applicable for a new location. Therefore, the acquiring unit 101 is further configured to update the interference radiation map when the location of the primary system changes. Change of the location of the primary system may be determined according to whether a path loss between the sensor or the secondary system apparatus and the receiver of the primary system changes. The determination may be performed by the sensor, the secondary system apparatus or the determining unit 102. This is because that it can be inferred that the location of the primary system changes if the operation parameters and wireless environment of the sensor or the secondary system apparatus and the primary system do not change and the path loss changes. In addition, if the primary system may report its location information, the acquiring unit 101 may also determine whether the location of the primary system changes according to the information.

In addition, the exclusion zone for the primary system is determined according to the interference radiation map, the states of the actual active secondary systems and the exclusion requirement of the primary system. Therefore, the acquiring unit 101 is configured to re-determine the exclusion zone for the primary system in the case that at least one of the following conditions is met: the location of the primary system changes; an interference exclusion requirement of the primary system changes; and access states and/or system parameters of the secondary systems change.

Specifically, as described above, when the location of the primary system changes, the interference radiation map changes, and therefore the exclusion zone for the primary system is to be recalculated.

When the interference exclusion requirement of the primary system changes, the exclusion zone boundary is to be recalculated according to only the changed interference exclusion requirement since the interference radiation map does not change. The change of the interference exclusion requirement of the primary system may be reported to the spectrum management device by the primary system, so that the acquiring unit 101 may determine whether the interference exclusion requirement changes.

In addition, when the access states and/or the system parameters of the secondary systems change, for example, a secondary system does not access to the spectrum of the primary system any more, a new secondary system accesses in or the emission power of the secondary system changes, the interference radiation map is corrected according to the changed parameters to obtain an updated interference intensity map. Further, the boundary of the exclusion zone is recalculated using the updated interference intensity map.

Although the several conditions are described separately, the conditions may be met simultaneously, thereby updating the interference radiation map and the exclusion zone for the primary system accordingly.

In addition, the acquiring unit 101 is further configured to cancel its exclusion zone when the primary system is turned off. For example, it may be determined according to information on a signal of the primary system measured by the sensors or the secondary system apparatus. If it is a noise signal, it may be determined that the primary system is turned off; otherwise, it may be determined that the primary system is turned on. In this way, the spectrum utilization efficiency can be effectively improved.

Second Embodiment

In the first embodiment, it is described mainly by assuming that there is one primary system in the management region of the spectrum management device, but the present technology is not limited thereto. In the case that there are multiple primary systems in the management region, the present technology is also applicable.

In the case that the multiple primary systems operates in an inter-frequency manner, there is no mutual interference since the primary systems do not operate on the same frequency band. An interference radiation map may be created for each primary system, and an exclusion zone for each primary system may be created using a respective interference radiation map.

In the case that the multiple primary systems use the same spectrum, the acquiring unit 101 is further configured to add interference amounts at corresponding locations of interference radiation maps of the respective primary systems to obtain synthesized interference amounts, so as to obtain a synthesized interference radiation map; and determine a uniform exclusion zone for the multiple primary systems based on the synthesized interference radiation map. The synthesized interference amount indicates an interference degree of the secondary system at the corresponding location to all the primary systems. The uniform primary system exclusion zone is determined according to the synthesized interference amount, thereby improving the spectrum utilization efficiency effectively.

In an example, the determining unit 102 may be configured: to correct, with system parameters of secondary systems in an active state, the synthesized interference amounts at locations corresponding to the secondary systems, to obtain a synthesized interference intensity map; rank, based on the synthesized interference intensity map, the secondary systems in the active state in an ascending order of the synthesized interference amounts; accumulate, according to a result of the ranking, interference amounts of corresponding secondary systems to one of the multiple primary systems with the highest interference exclusion requirement, so that the accumulated interference amount does not exceed a maximum accumulated interference amount allowable by the primary system and the number of the secondary systems of which the interference amounts are accumulated is as large as possible; and determine, based on a synthesized interference amount in the synthesized interference intensity map corresponding to a maximum interference amount among the interference amounts being accumulated, a boundary of the uniform exclusion zone.

In the embodiment, similar to the case where there is only one primary system in the first embodiment, firstly the synthesized interference radiation map is corrected to obtain the synthesized interference intensity map. The secondary systems are ranked according to the synthesized interference amount in the synthesized interference intensity map. However, the interference amounts of the secondary systems to one of the multiple primary systems with the highest interference exclusion requirement are used when performing the accumulating of the interference amounts, so that the determined exclusion zone can meet interference exclusion requirements of all the primary systems. Specifically, the accumulated interference amount just does not exceed a maximum accumulated interference amount allowable by this primary system. Next, the boundary of the uniform exclusion zone is determined according to the synthesized interference amounts, which is achieved by corresponding the maximum interference amount among the interference amounts being accumulated to the synthesized interference amount in the synthesized interference intensity map, i.e., a synthesized interference amount generated by a secondary system generating the maximum interference amount. In this way, the determining unit 102 may determine the synthesized interference amount or a corresponding interference level thereof as the boundary of the uniform exclusion zone, as in the first embodiment. A secondary system of which the synthesized interference amount exceeds the boundary is determined to be in the uniform exclusion zone. Alternatively, the determining unit 102 may also determine a connecting line of locations of the synthesized interference amounts or the corresponding interference level thereof in the synthesized interference intensity map as the boundary of the uniform exclusion zone. A secondary system of which a geographical location is within the boundary is determined to be in the uniform exclusion zone.

In addition, in the case that some secondary systems are to be weighted due to factors such as the priority level or the payment status, the synthesized interference amounts of the secondary systems may be weighted. The weighted synthesized interference amounts are ranked. However, corresponding un-weighted interference amounts to one of the multiple primary systems with the highest interference exclusion requirement are used when performing accumulating. Moreover, when determining whether the interference amount of a secondary systems exceed the boundary of the exclusion zone, the weighted synthesized interference amount is also to be used. For example, a secondary system of which the weighted synthesized interference amount exceeds the boundary is determined to be in the uniform exclusion zone.

According to the embodiment, in the case that there are multiple intra-frequency primary systems, the uniform exclusion zone can be determined for the primary systems, thereby improving the spectrum utilization efficiency effectively.

Third Embodiment

Figure 5:
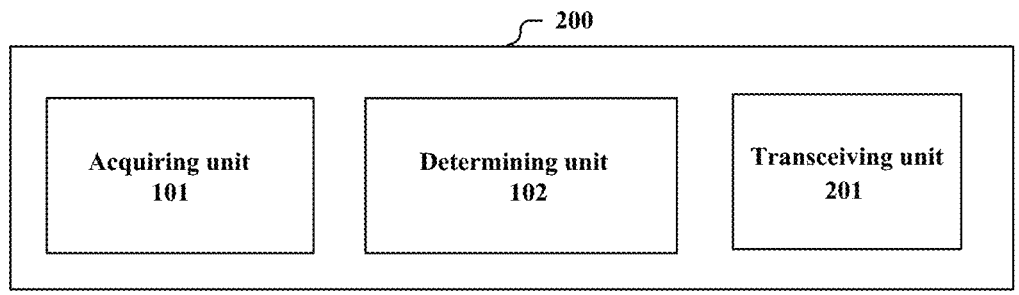
FIG. 5 is a block diagram showing functional modules of an electronic apparatus 200 for a spectrum management device according to an embodiment of the present disclosure.

FIG. 5 shows a block diagram of functional modules of an electronic apparatus 200 for a spectrum management device according to another embodiment of the present disclosure. As shown in FIG. 5, besides the units described with reference to FIG. 1, the electronic apparatus 200 further includes a transceiving unit 201, configured to receive a first interference radiation map from another spectrum management device as at least a part of an interference radiation map of the spectrum management device.

The transceiving unit 201 may be implemented as a transceiver, an antenna and so on, for example.

Referring to the scenario in FIG. 1*b* as an example, secondary systems coexisting with the primary system are controlled by multiple spectrum management devices. In this case, it is necessary to consider interference of secondary systems managed by the multiple spectrum management devices to the primary system. Therefore, when determining a boundary of an exclusion zone, the spectrum management device needs to acquire interference amounts of active secondary systems managed by another spectrum management device to the primary system and combine the interference amounts, so that the combined interference amount does not exceed the maximum accumulated interference amount allowable by the primary system.

In the embodiment, information on the interference radiation map is exchanged between the spectrum management devices, and it can be avoided that interference radiation maps are created by all the spectrum management devices, i.e., avoiding unnecessary repeated calculation, thereby reducing a calculation load. For example, in the case that secondary systems managed by two spectrum management devices are located in an identical region and require the same grid accuracy, the acquiring unit 101 of the electronic apparatus 200 may directly use the obtained first interference radiation map as the interference radiation map of the spectrum management device itself. In other cases, for example, the acquiring unit 101 may perform spatial interpolation based on the first interference radiation map obtained from another spectrum management device (also referred to as a source spectrum management device hereinafter) to acquire the interference radiation map of the spectrum management device (also referred to as a receiving spectrum management device hereinafter). In addition, in the case that regions where the secondary systems managed by the two spectrum management devices are located overlap partially, the receiving spectrum management device may arrange sensors or secondary system apparatus in regions not covered by the source spectrum management device and obtain interference amounts of secondary systems at locations in the regions to the primary system by sensing, to generate an interference radiation map for the regions (referred to as a second interference radiation map). Then, the first interference radiation map and the second interference radiation map are combined to obtain the interference radiation map of the receiving spectrum management device.

As described above, the received first interference radiation map further includes an ID of the primary system and operation parameter information used for obtaining the first interference radiation map, such as the emitting power and antenna parameters. The receiving spectrum management device may determine a primary system corresponding to the first interference radiation map according to the system ID, without interchanging sensitive information on the primary system. The operation parameter information may be used to correct the interference amounts in the interference radiation map to obtain an interference intensity map.

Since the secondary systems managed by the spectrum management devices each generate interference on the primary system when accessing to the spectrum of the primary system, the interference generated by the secondary systems managed by different spectrum management devices overlap with each other for the primary system. Therefore, when determining an exclusion zone for the primary system, a synthesized effect of the interference generated by the secondary systems managed by all the spectrum management devices needs to be considered.

Similar to the case in the first embodiment, in order to determine the exclusion zone more accurately, the interference radiation map is to be corrected with the current active state and system parameters of the secondary systems.

In an example, the transceiving unit 201 further receives information on interference amounts of secondary systems in an active state in a management region of another spectrum management device (i.e., the source spectrum management device) from the source spectrum management device. The determining unit 102 determines, based on the information and interference amounts of secondary systems in an active state in a management region of the spectrum management device, an exclusion zone boundary of the primary system, and the exclusion zone boundary is applied to the spectrum management device and the source spectrum management device. The interference amounts of the secondary systems in the active state in the management region of the spectrum management device are obtained by correcting, with system parameters of the secondary systems, the interference amounts at locations corresponding to the secondary systems in the interference radiation map.

The transceiving unit 201 may receive interference amounts generated by the secondary systems in the active state in the management region of the source spectrum management device from the source spectrum management device. For example, three of the secondary systems managed by the source spectrum management device are in the active state and generate interference amounts of 3 W, 5 W and 6 W respectively, and thus information including 3 W, 5 W and 6 W is provided to the receiving spectrum management device.

In addition, the transceiving unit 201 may receive information on the number of secondary systems in an active state falling in each interference level in the management region of the source spectrum management device from the source spectrum management device. For example, three of secondary systems managed by the source spectrum management device are in the active state and fall in interference levels 1, 2 and 3 respectively, and thus information including one secondary system in the interference level 1, one secondary system in the interference level 2 and one secondary system in the interference level 3 is provided to the receiving spectrum management device.

It can be seen that, with any of the above manners, the two spectrum management devices are not necessary to interchange sensitive information on the secondary systems, thereby ensuring security and privacy.

In the embodiment, the exclusion zone for the primary system is determined by the receiving spectrum management device and a result of the determining may be applied to both the receiving spectrum management device and the source spectrum management device. For example, the transceiving unit 201 is further configured to transmit information on the boundary of the exclusion zone to the source spectrum management device, to enable the source spectrum management device to implement the exclusion zone appropriately, such as turning off secondary systems in the exclusion zone. It should be noted that, although one source spectrum management device is shown as an example here, it is not limited. There may be multiple source spectrum management devices.

The determining unit 102 may: accumulate, in an ascending order of interference amounts, the interference amounts generated by secondary systems in an active state in management regions of both the spectrum management device and the source spectrum management device in sequence, so that the accumulated interference amount does not exceed a maximum accumulated interference amount allowable by the primary system and the number of secondary systems of which the interference amounts are accumulated is as large as possible; and determine an exclusion zone boundary based on a maximum interference amount among the interference amounts being accumulated.

Differing from the corresponding processing in the first embodiment, the determining unit 102 accumulates interference amounts generated by active secondary systems managed by both the source spectrum management device and the receiving spectrum management device, i.e., comprehensively considering effects of the secondary systems managed by both the source spectrum management device and the receiving spectrum management device. The boundary of the exclusion zone is determined also according to a principle that the accumulated interference amount just does not exceed the maximum accumulated interference amount allowable by the primary system. In addition, similar to the first embodiment, the determining unit 102 may determine the maximum interference amount or an interference level corresponding to the maximum interference amount as the boundary of the exclusion zone. A secondary system of which the interference amount exceeds the boundary is determined to be in the exclusion zone.

Alternatively, the determining unit 102 may determine a connecting line of locations of the maximum interference amount or the interference level corresponding to the maximum interference amount in the interference intensity map as the boundary of the exclusion zone. A secondary system of which a geographical location is within the boundary is determined to be in the exclusion zone. In this case, the interference intensity map may be a corrected interference radiation map of the receiving spectrum management device, or may be a map obtained by performing spatial interpolation on the corrected interference radiation map of the receiving spectrum management device, so that the map includes a value of the maximum interference amount or the interference level corresponding to the maximum interference amount.

Determination of an exclusion zone for the primary system is illustrated by taking the scenario shown in FIG. 1b as an example hereinafter. It is assumed that there are six secondary users $SS_1$ to $SS_6$ in the management region of the spectrum management device 1 and there are five secondary users $SS_7$ to $SS_{11}$ in the management region of the spectrum management device 2, the secondary systems coexist with the primary system, and numbers of the secondary systems are shown in FIG. 1b. It is assumed that the maximum accumulated interference allowable by the primary system is 50 W. According to the corrected interference amounts, interference amounts of the six secondary systems managed by the spectrum management device 1 to the primary system are 20 W, 15 W, 15 W, 5 W, 5 W and 4 W respectively, and interference amounts of the five secondary systems managed by the spectrum management device 2 to the primary system are 20 W, 10 W, 10 W, 4 W and 2 W respectively.

As an example, the spectrum management device 1 is a source spectrum management device, and the spectrum management device 2 is a receiving spectrum management device. The spectrum management device 1 informs the spectrum management device 2 of interference radiation amounts generated by the secondary systems managed by the spectrum management device 1. The spectrum management device 2 comprehensively considers the interference amounts of the eleven secondary systems when calculating a boundary of the exclusion zone, and accumulates from an interference amount with the lowest level in sequence until the accumulated interference amount just does not exceed 50 W, for example, 2 W+4 W+4 W+5 W+5 W+10 W+10 W<50 W but 2 W+4 W+4 W+5 W+5 W+10 W+10 W+15 W+15 W>50 W. Therefore, the maximum interference amount among the interference amount being accumulated is 10 W, i.e., the boundary of the exclusion zone is 10 W. Therefore, $SS_4$ to $SS_6$ and $SS_8$ to $SS_{11}$ are outside of the exclusion zone for the primary system, and can access to the spectrum of the primary system. $SS_1$ to $SS_3$ and $SS_7$ are inside the exclusion zone for the primary system, and cannot access to the spectrum of the primary system.

In some cases, weighting is to be performed on some secondary systems managed by the source spectrum management device and the receiving spectrum management device due to factors such as the priority level and payment status. In this case, the transceiving unit 201 may further receive information on corresponding weights such as {3 W, 1}, {5 W, 0.5} and {6 W, 1} when receiving interference amounts generated by active secondary systems managed by the source spectrum management device from the source spectrum management device. In this way, the determining unit 102 uses the weighted interference amounts when rank the interference amounts, and uses the original interference amounts when accumulating the interference amounts. For weighting of active secondary systems managed by the receiving spectrum management device, the determining unit 102 may process similarly. Practically, when determining whether a secondary system can access to the spectrum of the primary system, the weighted interference amounts are to be used for comparing with the boundary of the exclusion zone.

In the embodiment, when a location of the primary system changes, the source spectrum management device reacquires an interference radiation map, and provides the interference radiation map to the receiving spectrum management device to enable the receiving spectrum management device to re-determine the exclusion zone. In addition, if an interference exclusion requirement of the primary system changes, the receiving spectrum management device updates the exclusion zone for the primary system accordingly and provides information on the updated exclusion zone to the source spectrum management device.

When an access state or an operation parameter of a secondary system changes, a spectrum management device managing the secondary system informs the receiving spectrum management device of the change (in the case that the secondary system is managed by the receiving spectrum management device, the receiving spectrum management device directly acquires the change), so that the receiving spectrum management device recalculates the exclusion zone.

When an access state of the primary system changes, the spectrum management devices determine an on/off state of the exclusion zone for the primary system according to the access state. Specifically, in the case that the primary system is turned off, the exclusion zone may be canceled (i.e., turned off), thereby effectively improving the spectrum utilization efficiency.

Whether the spectrum management device being the source spectrum management device or the receiving spectrum management device may be specified in advance, or may be determined or changed dynamically during a communication process. For example, a spectrum management device detecting a change of an interference exclusion requirement of the primary system functions as the receiving spectrum management device, and the other spectrum management device functions as the source spectrum management device. A spectrum management device detecting a change of a location of the primary system functions as the source spectrum management device, and so on.

In the embodiment, information on the interference radiation map and interference amounts of the active secondary systems is interchanged between the spectrum management devices, a uniform exclusion zone for the same primary system is determined, and the number of the secondary systems allowed to be accessed can be increased effectively, thereby effectively improving the spectrum utilization efficiency. Moreover, it is not necessary to interchange specific information on the primary system and the secondary systems, thereby ensuring security and privacy.

Fourth Embodiment

In a scenario where multiple spectrum management devices coexist with a primary system, there may be multiple primary systems. If the multiple primary systems operate using different frequency bands, no interference is generated. A respective exclusion zone for each primary system may be determined as described in the third embodiment.

In another aspect, in the case that the multiple primary systems use the same spectrum, it needs to consider interference conditions of secondary systems to all the primary systems and a uniform exclusion zone is determined for the multiple primary systems, similar to the second embodiment.

It is described with reference to FIG. 5 hereinafter. At this time, a first interference radiation map received from a source spectrum management device is a synthesized interference radiation map for multiple primary systems, which is obtained by adding interference amounts at corresponding locations of interference radiation maps of the primary systems to obtain synthesized interference amounts. The transceiving unit 201 is further configured to receive, from the source spectrum management device, information on interference amounts of secondary systems in an active state in a management region of the source spectrum management device to one of the multiple primary systems with the highest interference exclusion requirement and synthesized interference amounts of the secondary systems. The determining unit 102 is configured to determine, based on the information, interference amounts of secondary systems in an active state in a management region of the receiving spectrum management device to one of the multiple primary systems with the highest interference exclusion requirement and synthesized interference amounts of the secondary systems, a boundary of a uniform exclusion zone for the multiple primary systems. The synthesized interference amounts of the secondary systems in the active state in the management region of the receiving spectrum management device are obtained by correcting, with systems parameters of the secondary systems, synthesized interference amounts at locations corresponding to the secondary systems in a synthesized interference radiation map of the receiving spectrum management device.

It can be seen that, differing from the operations in the scenario of a single primary system in the third embodiment, the determining unit 102 uses the interference amounts of the active secondary systems to one of the multiple primary systems with the highest interference exclusion requirement and the synthesized interference amounts of the active secondary systems. The active secondary systems may be managed by the source spectrum management device or the receiving spectrum management device.

As an example, the determining unit 102 may be configured to: accumulate, in an ascending order of synthesized interference amounts, interference amounts of secondary systems in an active state in management regions of both the receiving spectrum management device and the source spectrum management device to one of the primary systems with the highest interference exclusion requirement in sequence, so that the accumulated interference amount does not exceed the maximum accumulated interference amount allowable by the primary system and the number of the secondary systems of which the interference amounts are accumulated is as large as possible; and determine, based on a synthesized interference amount corresponding to the maximum interference amount among the interference amounts being accumulated (referred to as a maximum synthesized interference amount hereinafter), a boundary of the uniform exclusion zone.

For example, the determining unit 102 may determine the maximum synthesized interference amount or an interference level corresponding to the maximum synthesized interference amount as the boundary of the uniform exclusion zone. A secondary system of which the synthesized interference amount exceeds the boundary is determined to be in the uniform exclusion zone. Alternatively, the determining unit 102 determines a connecting line of locations of the maximum synthesized interference amount or the interference level corresponding to the maximum synthesized interference amount in the synthesized interference intensity map as the boundary of the uniform exclusion zone. A secondary system of which a geographical location is within the boundary is determined to be in the uniform exclusion zone. In this case, the synthesized interference intensity map may be a corrected synthesized interference radiation map of the receiving spectrum management device or a map obtained by performing spatial interpolation on the corrected synthesized interference radiation map of the receiving spectrum management device, so that the map includes a value of the maximum synthesized interference amount or the interference level corresponding to the maximum synthesized interference amount.

Similar to the case of a single primary system in the third embodiment, the transceiving unit 201 transmits information on the boundary of the uniform exclusion zone to the source spectrum management device, so that the source spectrum management device performs a corresponding operation, such as turning off secondary systems in the uniform exclusion zone, or the like.

In some cases, weighting is to be performed on some secondary systems managed by the source spectrum management device and the receiving spectrum management apparatus due to factors such as the priority level and payment status. In this case, the transceiving unit 201 further receives information on corresponding weights when receiving, from the source spectrum management device, information on interference amounts of active secondary systems managed by the source spectrum management device to one of the multiple primary systems with the highest interference exclusion requirement and the synthesized interference amount of the secondary systems. Or, the transceiving unit 201 receives, from the source spectrum management device, information on interference amounts of active secondary systems managed by the source spectrum management device to one of the multiple primary systems with the highest interference exclusion requirement and weighted synthesized interference amounts of the active secondary systems. In this way, the determining unit 102 ranks the synthesized interference amounts using the weighted synthesized interference amounts, and accumulates the interference amounts still using the interference amounts to one of the multiple primary systems with the highest interference exclusion requirement. For weighting of the active secondary systems managed by the receiving spectrum management device, the determining unit 102 may process similarly. Practically, when determining whether a secondary system can access to the spectrum of the primary system, the weighted synthesized interference amount is to be used for comparing with the boundary of the exclusion zone.

According to the embodiment, in the case that there are multiple intra-frequency primary systems and the secondary systems are managed by different spectrum management devices, the uniform exclusion zone is determined for the primary systems, thereby effectively improving the spectrum utilization efficiency.

Fifth Embodiment

Figure 6:
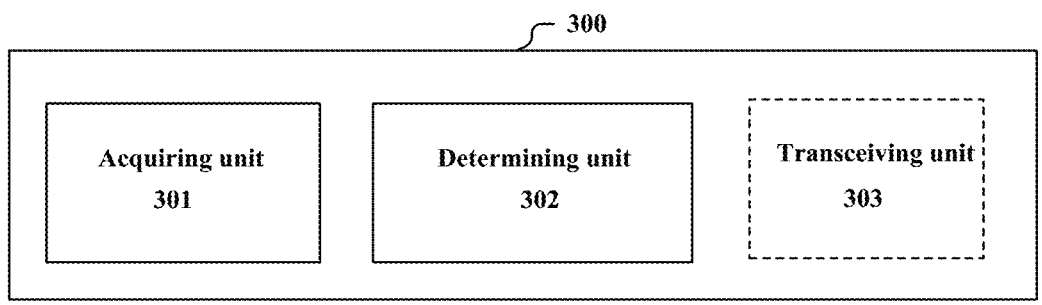
FIG. 6 is a block diagram showing functional modules of an electronic apparatus 300 for a spectrum management device according to an embodiment of the present disclosure.

FIG. 6 shows a block diagram of functional modules of an electronic apparatus 300 for a spectrum management device according to another embodiment of the present disclosure. The electronic apparatus 300 includes: an acquiring unit 301 configured to acquire, for a predetermined primary system, an interference radiation map representing interference amounts of secondary systems at locations in a management region of the spectrum management device to a primary system; and a determining unit 302 configured to determine, based on information on a boundary of the exclusion zone acquired from another spectrum management device, an exclusion zone for the primary system. Secondary systems in the exclusion zone cannot use a spectrum which is being used by the primary system, and the boundary of the exclusion zone is obtained by another spectrum management device based on the interference radiation map of the spectrum management device.

The acquiring unit 301 and the determining unit 302 may be implemented by one or more processing circuits. The processing circuit may be implemented as a chip, for example.

In the embodiment, the spectrum management device functions as a source spectrum management and is referred to as the source spectrum management device hereinafter. Another spectrum management device functions as a receiving spectrum management device and is referred to as the receiving spectrum management device hereinafter. The source spectrum management device provides an interference radiation map for the receiving spectrum management device, and the receiving spectrum management device determines, at least based on the interference radiation map, a uniform exclusion zone applicable to both the source spectrum management device and the receiving apparatus management apparatus.

The acquiring unit 301 may obtain the interference radiation map for the predetermined primary system by sensing or based on a wireless channel propagation model, and specific details are given in the description of the acquiring unit 101 in the first embodiment, which are not repeated here. As described above, the obtained interference radiation map includes a correspondence between locations in the management region and interference amounts of secondary systems at corresponding locations to the primary system. In addition, the interference radiation map may further include an ID of the primary system, and operation parameters used for generating the interference radiation map, such as the emission power and antenna parameters.

As shown by a dotted line box in FIG. 6, the electronic apparatus 300 may further include: a transceiving unit 303 configured to transmit information on the interference radiation map to another spectrum management device, and receive information on a boundary of the exclusion zone from another spectrum management device.

In an example, the acquiring unit 301 is further configured to correct, with system parameters of secondary systems in the active state, interference amounts at locations corresponding to the secondary systems in the interference radiation map, and the transceiving unit 303 is further configured to transmit information on the corrected interference amounts to the receiving spectrum management device, so that the receiving spectrum management device obtains the boundary of the exclusion zone based on the corrected interference amounts and the interference radiation map. The information on the boundary of the exclusion zone is used to specify a range of the exclusion zone, and secondary systems falling in the exclusion zone cannot access to the spectrum of the primary system.

Generally, the boundary of the exclusion zone may be obtained by the receiving spectrum management device based on information provided by the source spectrum management device such as the interference radiation map and the corrected interference amounts, and for specific manners, one may refer to related description in the first embodiment to the fourth embodiment. However, it should be understood that the acquisition manner of the boundary of the exclusion zone is not limited thereto, and the boundary of the exclusion zone may be acquired using any manner as long as the acquired boundary of the exclusion zone is applicable to both the source spectrum management device and the receiving spectrum management device.

After the information on the boundary of the exclusion zone is obtained, the determining unit 302 determines whether the secondary system can use the spectrum of the primary system according to a relationship between the corrected interference amount and the boundary of the exclusion zone, for example. For example, in the case that the boundary of the exclusion zone is indicated by an allowable maximum interference amount or an interference level corresponding to the maximum interference amount, the determining unit 302 compares a corrected interference amount of a secondary system with the boundary of the exclusion zone. If the corrected interference amount is greater than a value of the boundary of the exclusion zone, the corresponding secondary system cannot use the spectrum of the primary system; otherwise, the corresponding secondary system can use the spectrum of the primary system. In addition, the determining unit 302 corrects, with system parameters of secondary systems in an active state, interference amounts at locations corresponding to the secondary systems in the interference radiation map to obtain an interference intensity map. In the case that the boundary of the exclusion zone is indicated by a connecting line of locations of the allowable maximum interference amount or the interference level corresponding to the maximum interference amount in the interference intensity map, the determining unit 302 may determine whether a geographical location of a secondary system is in a range enclosed by the connecting line. If the geographical location of the secondary system is in the range enclosed by the connecting line, it is indicated that the secondary system is in the exclusion zone and cannot use the spectrum of the primary system; otherwise, the secondary system can use the spectrum of the primary system.

If different secondary systems have different priority levels, different access requirements or different payment status, weights may be set to embody the differences. For example, in the case that a secondary system is a payment user, the secondary system may use the spectrum of the primary system preferentially, which may be implemented by setting a weight less than 1 for the secondary system with high priority level. In this case, the determining unit 302 further weights the corrected interference amounts, and the transceiving unit 303 transmits corresponding weights or weighted corrected interference amounts to the receiving spectrum management device. The receiving spectrum management device calculates accumulated interference to the primary system using the corrected interference amounts, and ranks the interference amounts to determine an order in which the interference amounts are to be accumulated by using the weighted corrected interference amounts. Accordingly, the determining unit 302 may also weight the corrected interference amounts when performing the determination, i.e., using the weighted corrected interference amounts.

In another example, there are multiple primary systems. If the multiple primary systems operate using different frequency bands, the acquiring unit 301 acquires an interference radiation map for each primary system, and the transceiving unit 303 provides the interference radiation map to the receiving spectrum management device. Since it is considered that there is no mutual interference between different frequency bands, the description for a single primary system above also adapts to each of the multiple primary systems.

If the multiple primary systems use the same spectrum, it needs to consider synthesized interference of the secondary systems to the multiple primary systems. In this case, the acquiring unit 301 is further configured to add interference amounts at corresponding locations of interference radiation maps of the respective primary systems to obtain synthesized interference amounts, so as to obtain a synthesized interference radiation map. The transceiving unit 303 is configured to transmit the synthesized interference radiation map to the receiving spectrum management device, so that the receiving spectrum management device obtains the boundary of the exclusion zone based on the synthesized radiation interference map.

Exemplarily, the determining unit 302 may correct, with system parameters of secondary systems in an active state, interference amounts at locations corresponding to the secondary systems in the interference radiation maps to obtain corresponding corrected interference amounts, so as to obtain corrected synthesized interference amounts. The transceiving unit 303 transmits information on the corrected synthesized interference amounts and corrected interference amounts to one of the multiple primary systems with the highest interference exclusion requirement to the receiving spectrum management device, so that the receiving spectrum management device obtains the boundary of the exclusion zone based on the information and the synthesized interference radiation map.

Similarly, in the case that weighting is to be performed on some secondary systems due to factors such as the priority level or payment status, the transceiving unit 303 needs to transmit information on weights to the receiving spectrum management device, or transmit information on corrected interference amounts of the active secondary systems to one of the multiple primary systems with the highest interference exclusion requirement and weighted corrected synthesized interference amounts of the active secondary systems to the receiving spectrum management device. When determining whether an interference amount of a secondary system exceeds a boundary of the exclusion zone, the weighted corrected synthesized interference amount is also to be used.

The receiving spectrum management device may obtain the boundary of the exclusion zone as described in the fourth embodiment, which is not repeated here.

It should be understood that, the electronic apparatus 300 in the embodiment may further include components of the electronic apparatus 100 and 200 described in the first embodiment to the fourth embodiment and corresponding functions. In other words, the spectrum management device may have functions of both the source spectrum management device and the receiving spectrum management device.

Sixth Embodiment

As described above, sensors for sensing in the spectrum management region may be replaced at least partially by secondary system apparatus. The secondary system apparatus is a device in a wireless communication system functioning as a secondary system, for example, a network node or a network control terminal in the secondary system. For example, in a cellular communication system, the secondary system apparatus may be a base station (including an infrastructure in communication with a macro base station, such as a small cell base station) or a terminal apparatus such as a mobile terminal, an intelligent vehicle and an intelligent wearable device with cellular communication capability.

Figure 7:
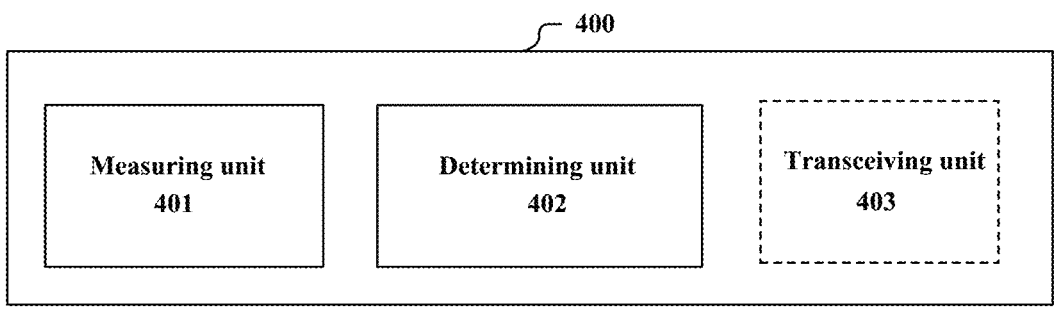
FIG. 7 is a block diagram showing functional modules of an electronic apparatus 400 for a wireless communication device according to an embodiment of the present disclosure.

Therefore, an electronic apparatus 400 for a wireless communication device is provided according to an embodiment of the present disclosure, and FIG. 7 shows a block diagram of functional modules of the electronic apparatus 400. The electronic apparatus 400 includes: a measuring unit 401 configured to measure a power of a signal received from a primary system; and a determining unit 402 configured to determine, based on the measured power, information on an interference amount of the wireless communication device to the primary system in the case of a predetermined emission power and predetermined antenna parameters. The information is provided to a management apparatus managing multiple secondary systems and the management apparatus determines an exclusion zone for the primary system.

The management apparatus may be for example the spectrum management device mentioned in the first embodiment to the fifth embodiment, but is not limited thereto. The measuring unit 401 and the determining unit 402 may be implemented by one or more processing circuits. The processing circuit may be implemented as a chip, for example.

The electronic apparatus 400 is configured to provide information on an interference amount at a location of the secondary system corresponding to a wireless communication device where the electronic apparatus 400 is located. For secondary systems in a management region of the management apparatus, the same predetermined emission power and predetermined antenna parameter are used.

In an example, the determining unit 402 is configured to determine a path loss between a location where the wireless communication device is located and the primary system based on the measured power, and determines, based on the path loss, the interference amount of the wireless communication device to the primary system in the case of the predetermined emitting power and the predetermined antenna parameters.

The information on the interference amount is used by the management apparatus for example to determine an interference radiation map, which represents interference amounts of secondary systems at locations in the management region of the management apparatus to the primary system. The interference radiation map and its application in determining the exclusion zone for the primary system are described in detail in the above embodiments, which are not repeated here.

In the embodiment, the electronic apparatus 400 functions as a sensor for sensing. In the case that there is a sensor, the electronic apparatus 400 needs to use the same parameter configuration as the sensor, such as an antenna gain in a direction of the primary system and an emission power.

As shown by a dotted line box in FIG. 7, the electronic apparatus 400 may further include: a transceiving unit 403 configured to transmit the information to the management apparatus. The transceiving unit 403 is further configured to transmit system parameters of a secondary system corresponding to the wireless communication device to the management apparatus, so that the management apparatus determines the exclusion zone for the primary system further according to the system parameters. The system parameters include for example a location of a secondary system, the emission power used actually and the antenna parameters such as the antenna height, the antenna orientation and the antenna gain. For example, the management apparatus may correct the interference radiation map based on the system parameters.

In the case that the wireless communication device is a terminal apparatus, the transceiving unit 403 may transmit the information to a base station and the information is transmitted to the management apparatus by the base station, for example.

The electronic apparatus 400 according to the embodiment may sense a signal of the primary system, and thus assist the management apparatus to determine the exclusion zone, thereby improving determining accuracy of the exclusion zone.

Seventh Embodiment

In the process of describing the electronic apparatus for spectrum management device in the embodiments described above, obviously, some processing and methods are also disclosed. Hereinafter, an overview of the methods is given without repeating some details disclosed above. However, it should be noted that, although the methods are disclosed in a process of describing the electronic apparatus for spectrum management device, the methods do not certainly employ or are not certainly executed by the aforementioned components. For example, the embodiments of the electronic apparatus for spectrum management device may be partially or completely implemented with hardware and/or firmware, the method for the spectrum management device described below may be executed by a computer-executable program completely, although the hardware and/or firmware of the electronic apparatus for the spectrum management device can also be used in the methods.

Figure 8:
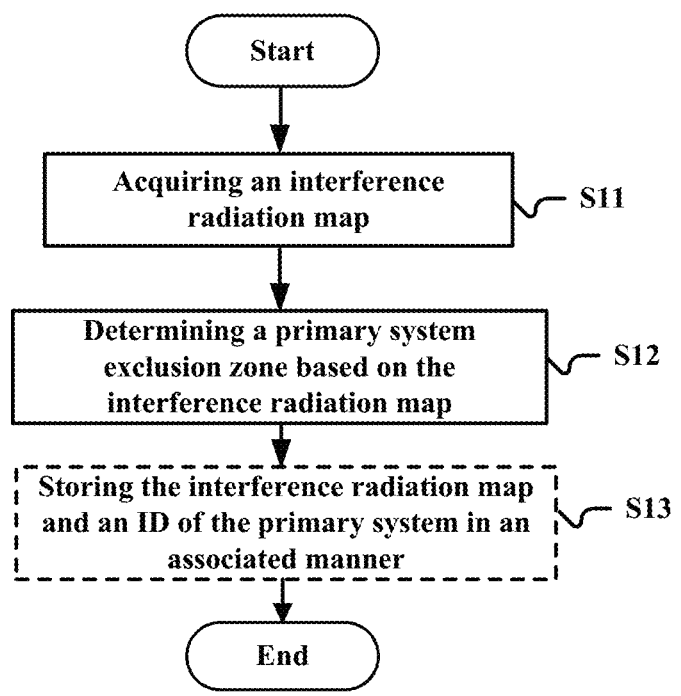
FIG. 8 is a flowchart of a method for a spectrum management device according to an embodiment of the present disclosure.

FIG. 8 shows a flowchart of a method for a spectrum management device according to an embodiment of the present disclosure. As shown in FIG. 8, the method includes: acquiring, for a predetermined primary system, an interference radiation map representing interference amounts of secondary systems at locations in a management region of the spectrum management device to a primary system (S11); and determining an exclusion zone for the primary system based on the interference radiation map (S12). A secondary system in the exclusion zone cannot use a spectrum which is being used by the primary system.

Figure 9:
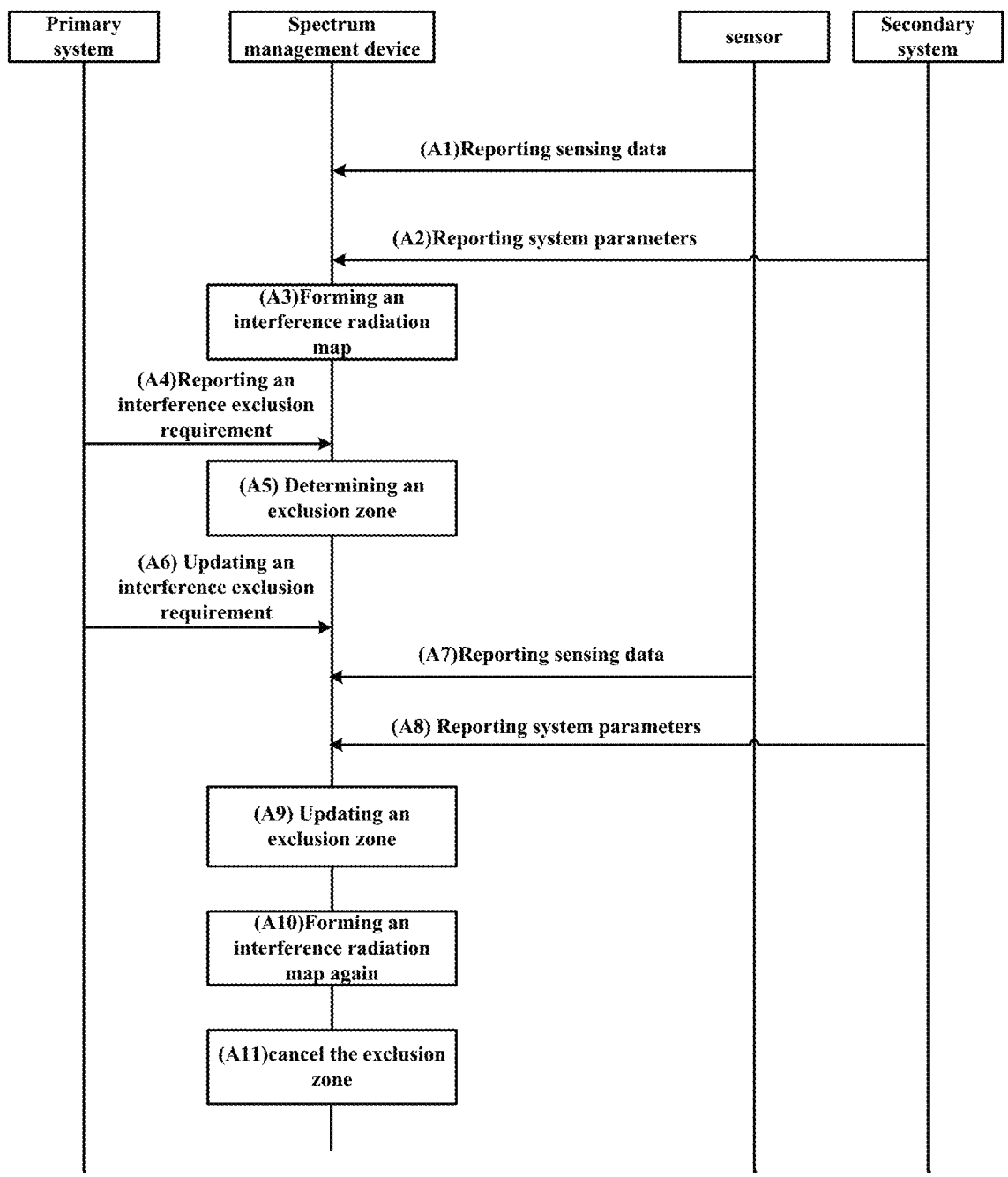
FIG. 9 is a schematic diagram showing the information procedure between a spectrum management device, a primary system, a secondary system and a sensor for sensing.

In order to facilitate understanding, FIG. 9 shows a schematic diagram of the information procedure between a spectrum management device, a primary system, a secondary system and a sensor for sensing. In FIG. 9, a case of only a single spectrum management device is considered. It is described in the following with reference to FIG. 8 and FIG. 9.

In step S11, an interference radiation map may be acquired based on a measurement result of a signal of the primary system measured by multiple sensors arranged in a management region in advance and/or secondary system apparatus in the management region. A corresponding operation is indicated as A1 in FIG. 9, a sensor (not shown in the figure, or a secondary system apparatus) reports sensed data to the spectrum management device, and the sensed data may for example include: a power of a signal received from the primary system, a path loss between the primary system and a location where the sensor is located, an active state of the primary system, and so on.

If the sensor reports the power of the signal received from the primary signal, in step S11, a path loss between a location corresponding to the sensor or the secondary system apparatus and the primary system is calculated based on the measurement result, and an interference amount of a secondary system at the location to the primary system is calculated based on the path loss. If the path loss is calculated by the sensor, in step S11, the interference amount of the secondary system at the location to the primary system is calculated directly based on the path loss. In this way, in A3, an interference radiation map may be formed. The interference radiation map includes a correspondence between locations and interference amounts. It may also include an identifier (ID) of the primary system, operation parameter information on the sensor or the secondary system apparatus used for generating the interference radiation map and the like.

Alternatively, A1 may not be performed, and the interference radiation map is acquired based on a wireless channel propagation model. In addition, spatial interpolation may be performed on the interference radiation map to obtain an interference radiation map with a finer granularity.

In A2, the secondary system reports its system parameters (or its operation parameters) such as the location, the emission power and the antenna parameters (for example including an antenna height, an antenna orientation and antenna gains in all directions) to the spectrum management device.

In step S12, interference amounts at locations corresponding to secondary systems in an active state in the interference radiation map are corrected with system parameters of the secondary systems, to obtain an interference intensity map, and an exclusion zone is determined based on the interference intensity map.

As an example, in step S12, the exclusion zone may be determined as follows: accumulating, based on the interference intensity map, interference amounts generated by secondary systems in an active state in an ascending order of the interference amounts, so that the accumulated interference amount does not exceed a maximum accumulated interference amount allowable by the primary system and the number of the secondary systems of which the interference amounts are accumulated is as large as possible; and determining the boundary of the exclusion zone based on a maximum interference amount among the interference amounts being accumulated. For example, the maximum interference amount or an interference level corresponding to the maximum interference amount may be determined as the boundary of the exclusion zone. A secondary system of which an interference amount exceeds the boundary is determined to be in the exclusion zone. A connecting line of locations of the maximum interference amount or the interference level corresponding to the maximum interference amount in the interference intensity map may be determined as the boundary of the exclusion zone. A secondary system of which a geographical location is within the boundary is determined to be in the exclusion zone.

In the above processing, the maximum accumulated interference amount allowable by the primary system is determined based on an interference exclusion requirement of the primary system. As shown by A4 in FIG. 9, the interference exclusion requirement is reported to the spectrum management device by the primary system. Processing performed in A5 in FIG. 9 corresponds to processing performed in step S12 in FIG. 8.

In an example, when the secondary systems in an active state are ranked in an ascending order of interference amounts, interference amounts of at least a part of the secondary systems may be weighted. The weighting may be performed based on one or more of the following factors: a priority level of a secondary system and a payment status of the secondary system. In this way, a secondary system with a high priority level or a payment secondary system can access to the spectrum of the primary system preferentially.

As shown in FIG. 9, when an interference exclusion requirement of the primary system changes, the primary system informs the spectrum management device of the updated interference exclusion requirement (A6), and the spectrum management device re-determines the exclusion zone accordingly (A9). In addition, the sensor or the secondary system apparatus reports sensed data to the spectrum management device (A8). When the sensed data changes, it is indicated that a location of the primary system changes; in this case, an interference radiation map needs to be formed again and an exclusion zone is to be calculated again (A9 and A10). In another aspect, the secondary system reports its system parameters to the spectrum management device; when the system parameters change, it needs to re-determine the exclusion zone (A9). The sensor or the secondary system apparatus may report an active state of the primary system, i.e., being turned on or turned off, to the spectrum management device, and the spectrum management device cancels the exclusion zone when the primary system is turned off, to further improve the spectrum utilization efficiency. It should be understood that, A6, A7 and A8 are not performed in a fixed order, and are performed by triggering and/or performed periodically.

In the case that there are multiple primary systems and the multiple primary systems use a same spectrum, in step S11, interference amounts at corresponding locations of interference radiation maps for the respective primary systems are added to obtain synthesized interference amounts, so as to obtain a synthesized interference radiation map. In step S12, a uniform exclusion zone is determined for the multiple primary systems based on the synthesized interference radiation map. When a location of any of the primary systems changes, an interference radiation map is to be reacquired. When an interference exclusion requirement of any of the primary systems changes, an exclusion zone is to be re-determined.

In an example, in step S12, the uniform exclusion zone is determined as follows: correcting, with system parameters of secondary systems in an active state, a synthesized interference amount at locations corresponding to the secondary systems in a synthesized interference radiation map, to obtain a synthesized interference intensity map; ranking, based on the synthesized interference intensity map, the secondary systems in the active state in an ascending order of the synthesized interference amounts; accumulating, based on a result of the ranking, interference amounts of corresponding secondary systems to one of the multiple primary systems with the highest interference exclusion requirement in sequence, so that the accumulated interference amount does not exceed a maximum accumulated interference amount allowable by the primary system and the number of the secondary systems of which the interference amounts are accumulated is as large as possible; and determining, based on a synthesized interference amount corresponding to a maximum interference amount among the interference amounts being accumulated in the synthesized interference intensity map, a boundary of the uniform exclusion zone.

As shown by a dotted line box in FIG. 8, the method may further include step S13: storing an identifier of the primary system and the interference radiation map of the primary system in an associated manner.

The method described above is applied to a scenario of a single spectrum management device. In a scenario where multiple spectrum management devices determine the exclusion zone for the primary system in conjunction with each other by interchanging information, the exclusion zone may be determined based on interference of all secondary systems managed by all the spectrum management devices to the primary system. For example, a spectrum management device may receive information on interference amounts generated by secondary systems managed by another spectrum management device, and determine the exclusion zone based on the information and interference amounts generated by secondary systems managed by the spectrum management device itself which are obtained based on the interference radiation map.

In an example, in order to save the calculation cost, an interference radiation map may be generated by one spectrum management device and the interference radiation map is shared among multiple spectrum management devices. Therefore, in step S11, a first interference radiation map may be received from another spectrum management device, as at least a part of the interference radiation map of the spectrum management device. Spatial interpolation may be performed based on the first interference radiation map to acquire the interference radiation map of the spectrum management device.

In step S12, information on interference amounts of secondary systems in an active state in a management region of another spectrum management device is received from another spectrum management device, and a boundary of the exclusion zone for the primary system is determined based on the information and interference amounts of secondary systems in an active state in the management region of the spectrum management device. The boundary of the exclusion zone is applied to the spectrum management device and another spectrum management device. The interference amounts of the secondary systems in the active state in the management region of the spectrum management device is obtained by correcting, with system parameters of the secondary systems, interference amounts at locations corresponding to the secondary systems in the interference radiation map. The received information on the interference amounts may be interference amounts generated by secondary systems in the active state in the management region of another spectrum management device, or the number of secondary systems in the active state falling in each interference level in the management region of another spectrum management device.

Specifically, in step S12, interference amounts generated by the secondary systems in the active state in management regions of both the spectrum management device and another apparatus management apparatus may be accumulated in sequence in an ascending order of the interference amounts, so that the accumulated interference amount does not exceed a maximum accumulated interference amount allowable by the primary system and the number of the secondary systems of which the interference amounts are accumulated is as large as possible; and the boundary of the exclusion zone is determined based on a maximum interference amount among the interference amounts being accumulated.

In addition, in the case that there are multiple primary systems and the multiple primary systems uses a same spectrum, a first interference radiation map is a synthesized interference radiation map for the multiple primary systems. The synthesized interference radiation map is obtained by adding interference amounts at corresponding locations of interference radiation maps for the respective primary systems to obtain synthesized interference amounts. In step S11, information on interference amounts of secondary systems in an active state in a management region of another spectrum management device to one of the multiple primary systems with the highest interference exclusion requirement and synthesized interference amounts of the secondary systems is received from another spectrum management device. In step S12, a boundary of a uniform exclusion zone for the multiple primary systems is determined based on the information, interference amounts of secondary systems in an active state in a management region of the spectrum management device to one of the multiple primary systems with the highest interference exclusion requirement, and the synthesized interference amount of the secondary systems. The synthesized interference amounts of the secondary systems in the active state in the management region of the spectrum management device are obtained by correcting, with system parameters of the secondary systems, a synthesized interference amount at locations corresponding to the secondary systems in a synthesized interference radiation map of the spectrum management device. Specifically, interference amounts generated by the secondary systems in the active state in management regions of both the spectrum management device and another spectrum management device to one of the multiple primary systems with the highest interference exclusion requirement can be accumulated in sequence in an ascending order of the synthesized interference amounts, so that the accumulated interference amount does not exceed a maximum accumulated interference amount allowable by the primary system and the number of the secondary systems of which the interference amounts are accumulated is as large as possible; and a boundary of the uniform exclusion zone is determined based on a synthesized interference amount corresponding to a maximum interference amount among the interference amounts being accumulated.

In the case that weighting is performed on some secondary systems due to factors such as the priority level and payment status, for example, the interference amount is multiplied by a coefficient less than 1, the information received in step S11 further includes information on the weighting or a weighted synthesized interference amount. In step S12, it is ranked using the weighted synthesized interference amounts, and interference amounts to one of the multiple primary systems with the highest interference exclusion requirement are accumulated. Further, it is determined whether the secondary systems are in the exclusion zone using the weighted synthesized interference amounts.

Although not shown in the figure, the method may further include: transmitting information on the boundary of the exclusion zone or the uniform exclusion zone to another spectrum management device.

Figure 10:
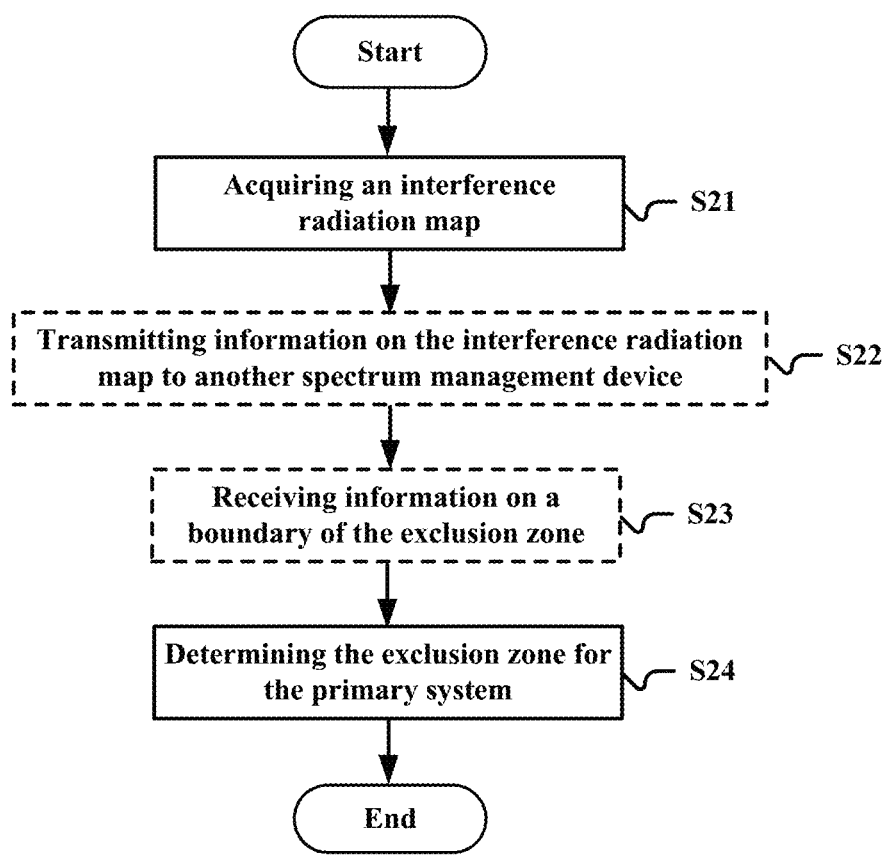
FIG. 10 is a flowchart of a method for a spectrum management device according to an embodiment of the present disclosure.

Accordingly, in a scenario where the multiple spectrum management devices determine the exclusion zone for the primary system in conjunction with each other by an information interchange, a spectrum management device providing an interference radiation map may perform a method shown in FIG. 10. The method includes: acquiring, for a predetermined primary system, an interference radiation map representing interference amounts of secondary systems at locations in a management region of a spectrum management device to a primary system (S21); and determining an exclusion zone for the primary system based on information on a boundary of the exclusion zone acquired from another spectrum management device (S24). A secondary system in the exclusion zone cannot use a spectrum which is being used by the primary system, and the boundary of the exclusion zone is obtained by another spectrum management device based on the interference radiation map of the spectrum management device.

As shown by a dotted line in FIG. 10, the method may further include: transmitting the information on the interference radiation map to another spectrum management device (S22); and receiving information on the boundary of the exclusion zone from another spectrum management device (S23).

The interference amounts at locations corresponding to secondary systems in an active state in the interference radiation map may further be corrected with systems parameters of the secondary systems. In step S22, information on the corrected interference amounts is transmitted to another spectrum management device, so that another spectrum management device obtains the boundary of the exclusion zone based on the corrected interference amounts and the interference radiation map. In step S24, it may be determined whether a secondary system can use a spectrum of the primary system based on a relationship between the corrected interference amount and the boundary of the exclusion zone.

In the case that weighting is to be performed on some secondary systems due to factors such as the priority level and payment status, in step S22, information on the weighting is also transmitted to another spectrum management device, so that another spectrum management device ranks the weighted corrected interference amounts. However, it should be noted that, un-weighted corrected interference amounts are accumulated. Moreover, in step S24, the corrected interference amounts are weighted when the determining is performed.

In the case that there are multiple primary systems and the multiple primary systems use a same spectrum, in step S21, interference amounts at corresponding locations of interference radiation maps for the respective primary systems are added to obtain synthesized interference amounts, so as to obtain a synthesized interference radiation map. In step S22, the synthesized interference radiation map is transmitted to another spectrum management device, so that another spectrum management device obtains the boundary of the exclusion zone based on the synthesized interference radiation map.

For example, interference amounts at locations corresponding to secondary systems in an active state in the interference radiation maps may be corrected with system parameters of the secondary systems. In step S22, information on the corrected synthesized interference amount and corrected interference amounts to one of the multiple primary systems with the highest interference exclusion requirement is transmitted to another spectrum management device, so that another spectrum management device obtains the boundary of the exclusion zone based on the information and the synthesized interference radiation map.

Similarly, in the case that weighting is to be performed on some secondary systems due to factors such as the priority level and payment status, in step S21, information on the weighting is also transmitted to another spectrum management device, so that another spectrum management device ranks the weighted corrected synthesized interference amounts. However, it should be understood that, un-weighted corrected synthesized interference amounts are accumulated. Moreover, in step S24, the corrected synthesized interference amounts are weighted when the determining is performed.

It should be noted that, the above methods may be used in combination or separately, and details thereof are described in detail in the first embodiment to the fifth embodiment, which are not repeated here.

Figure 11:
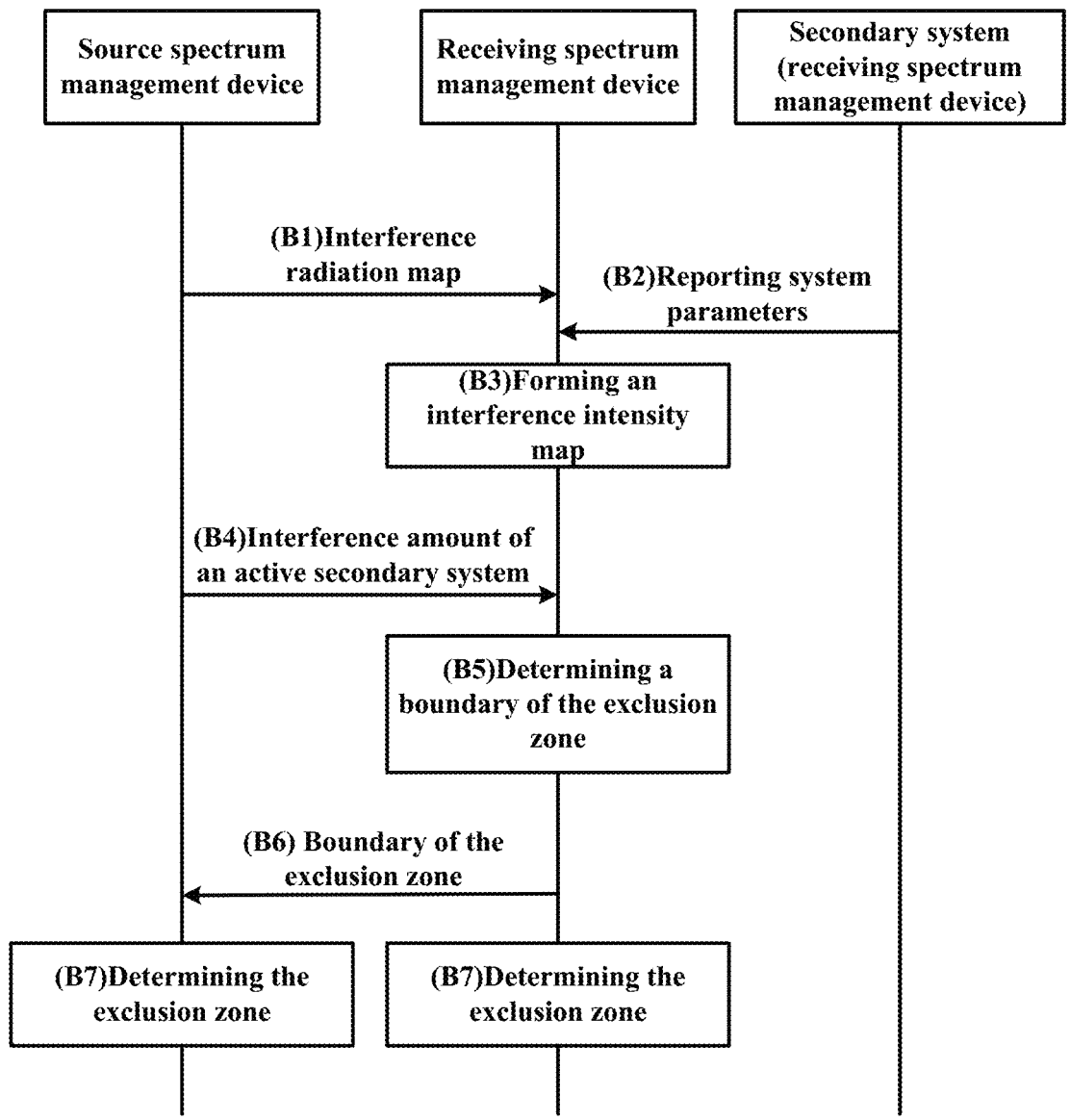
FIG. 11 is a schematic diagram showing the information procedure between spectrum management devices.

In order to facilitate understanding, FIG. 11 further shows a schematic diagram of the information procedure that multiple spectrum management devices interact to determine a uniform exclusion zone for a primary system. In the example, there are two spectrum management devices; and in order to distinguish from each other, the two spectrum management devices are named as a source spectrum management device and a receiving spectrum management device respectively. However, it should be understood that it is only exemplary and is not intended to limit.

Firstly, the source spectrum management device transmits information on an interference radiation map to the receiving spectrum management device (B1). Secondary systems managed by the receiving spectrum management device transmit their system parameters such as a location, an emission power and antenna parameters to the receiving spectrum management device (B2). The receiving spectrum management device obtains its interference radiation map based on information in B1, and obtains an interference intensity map based on parameters in B2 and the interference radiation map (B3). The source spectrum management device provides interference amounts of active secondary systems managed by the source spectrum management device to the receiving spectrum management device (B4). The receiving spectrum management device determines a boundary of an exclusion zone for the primary system based on its interference intensity map and the interference amounts of the active secondary systems in B4 (B5), and transmits the boundary of the exclusion zone to the receiving spectrum management device (B6). The source spectrum management device and the receiving spectrum management device determine the exclusion zone for the primary system according to the boundary of the exclusion zone (B7). Details of the processes in FIG. 11 have been described in detail in the above embodiments, which are not repeated here.

Figure 12:
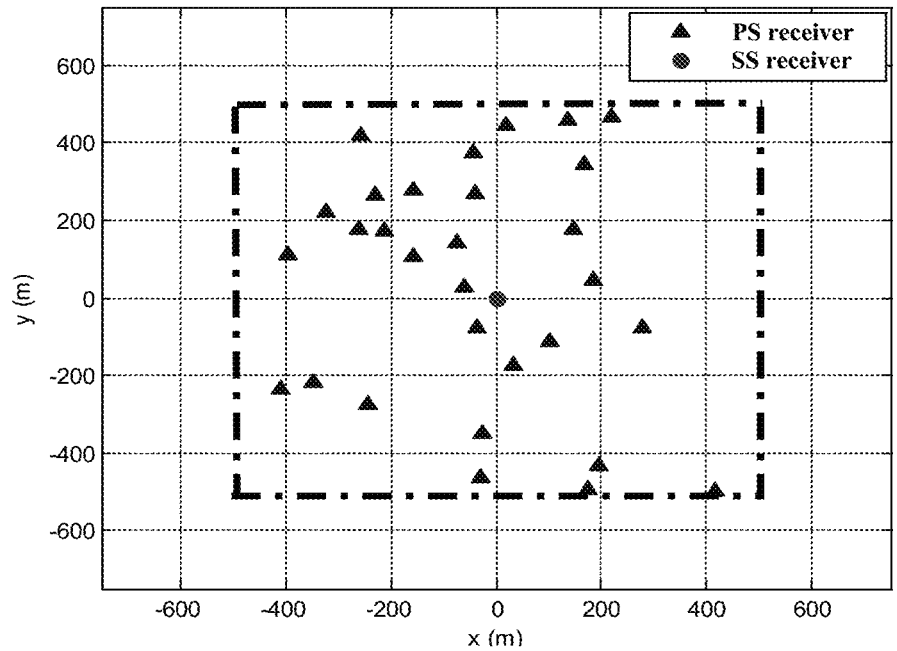
FIG. 12 is a schematic diagram showing an example of a simulation scenario.

In order to further illustrate technical effects which can be achieved according to the technical solutions of the present disclosure, the following simulation is performed. FIG. 12 shows a schematic diagram of a scenario for simulation, and in the scenario, there is one primary system and all secondary systems are managed by the same spectrum management device. As shown in the figure, a management region of 500 m×500 m is considered, a receiver of the primary system is located at a center of the management region, transmitters of thirty secondary systems are distributed in the management region randomly and uniformly, and only a large scale path loss is considered during the simulation. Simulation parameters are set as follows: an emission power of a transmitter of a secondary system is 3 dBm, a minimum distance between transmitters of two secondary systems is 40 m, maximum interference allowable by a receiver of the primary system is −60 dBm, and a path loss exponent is 3.

Figure 13:
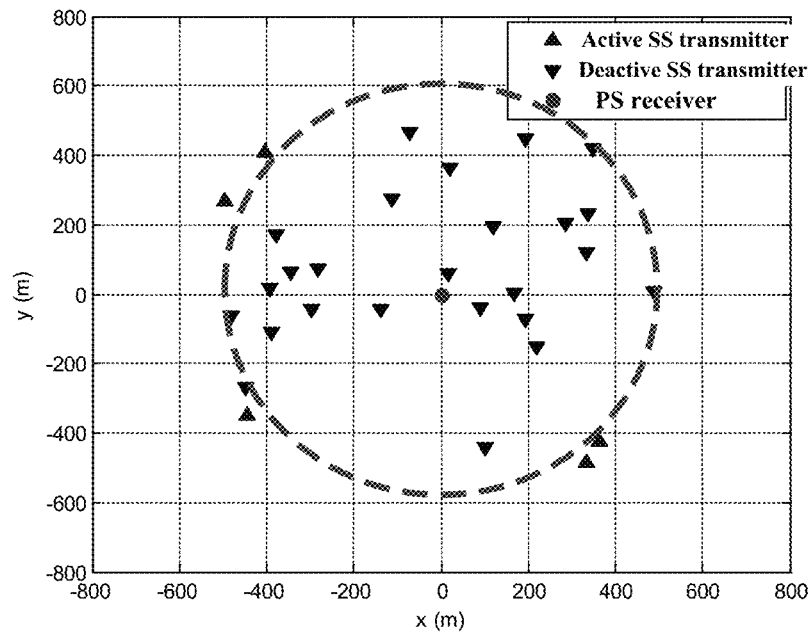
FIG. 13 is a schematic diagram showing an example of a circular exclusion zone for the primary system.
Figure 14:
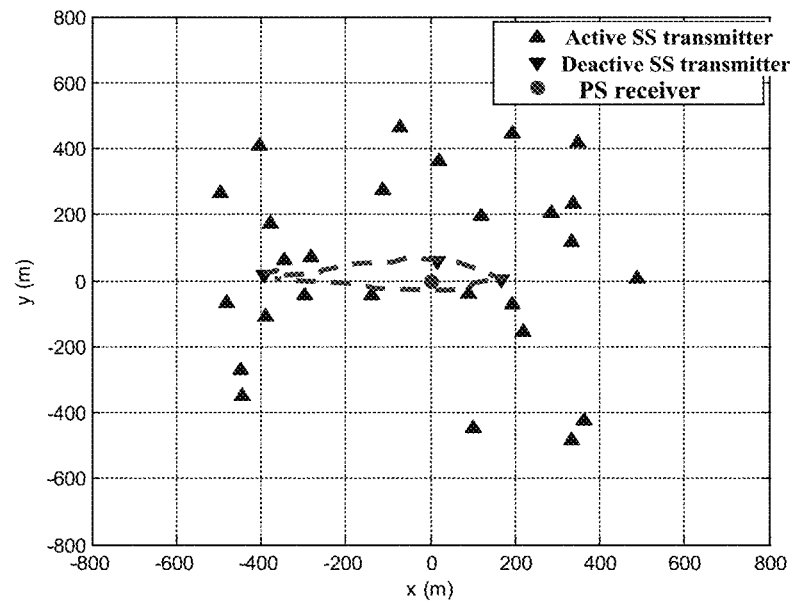
FIG. 14 is a schematic diagram showing an example of an irregular exclusion zone for the primary system obtained according to the technology of the present disclosure.
Figure 15:
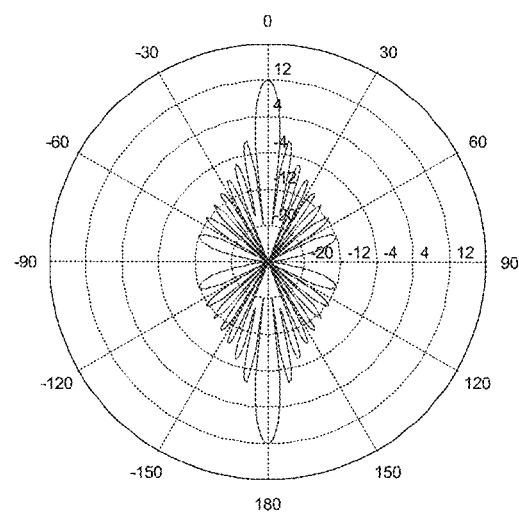
FIG. 15 is a beam pattern of an antenna of the primary system used during simulation.

During the simulation, only locations of the thirty secondary systems are changed, and 10000 times of cycle simulation are performed. In order to facilitate comparison, a case of using a circular exclusion zone and a case of using an exclusion zone obtained according to the present technology are simulated respectively. FIG. 13 shows a schematic diagram of a circular exclusion zone, and FIG. 14 shows a schematic diagram of an irregular exclusion zone obtained according to the present technology. An antenna of a receiver of a primary system is a directional antenna and has a beam pattern as shown in FIG. 15, in which, an antenna gain in a direction of a beam main lobe, i.e., a maximum antenna gain is 12 dBi. The circular exclusion zone is constructed based on the following principle: a radius of the exclusion zone is calculated, so that accumulated interference ($I_{agg}$) generated by secondary systems outside of the exclusion zone does not exceed an interference exclusion requirement ($I_{th}$) of the primary system. It can be seen that, as compared with the circular exclusion zone, the irregular exclusion zone obtained according to the present disclosure is reduced significantly, and the number of secondary systems which can access to a spectrum of the primary system is increased significantly.

Figure 16:
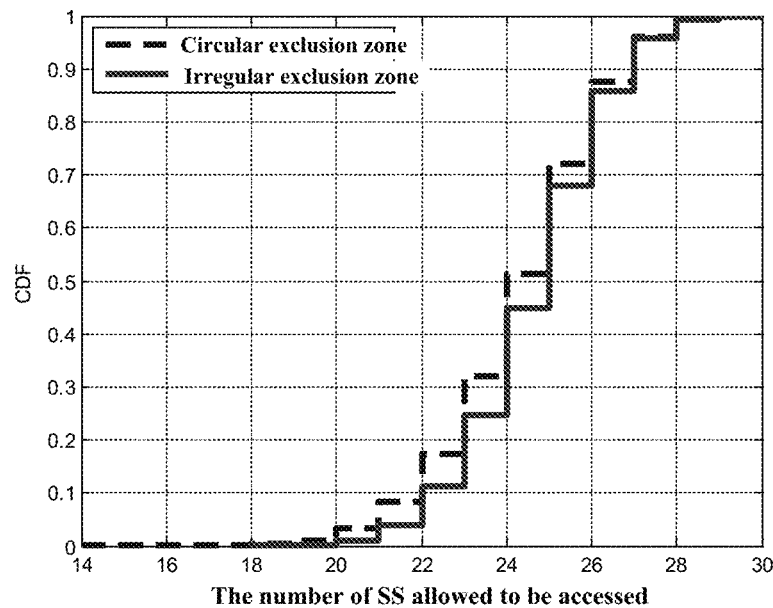
FIG. 16 is diagram showing comparison of accumulation distribution functions for the number of accessible secondary systems based on a circular primary system exclusion zone and a primary system exclusion zone obtained according the technology of the present disclosure respectively, in the case that a receiver antenna of the primary system is an omnidirectional antenna.
Figure 17:
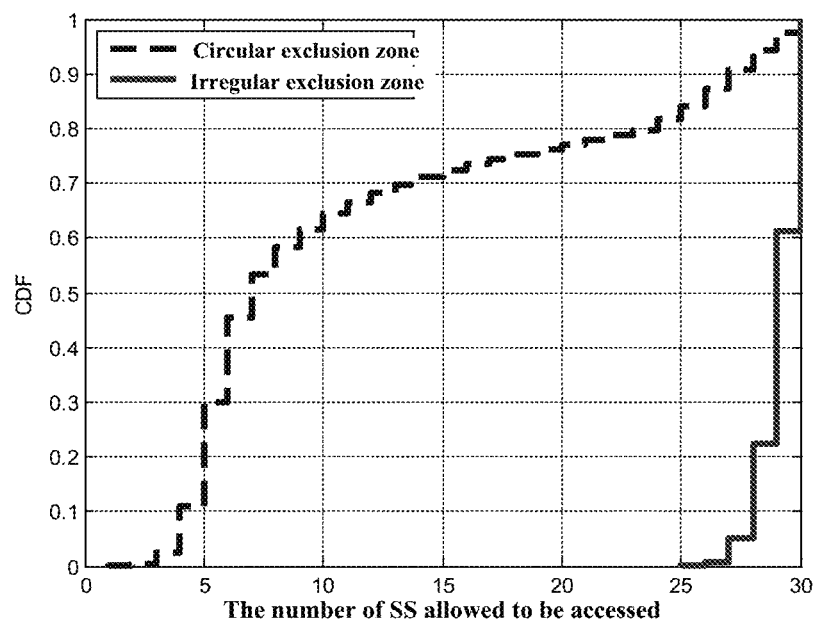
FIG. 17 is diagram showing comparison of accumulation distribution functions for the number of accessible secondary systems based on a circular primary system exclusion zone and a primary system exclusion zone obtained according the technology of the present disclosure respectively, in the case that a receiver antenna of the primary system is a directional antenna shown in FIG. 15.

In addition, FIG. 16 is a diagram showing comparison of cumulative distribution functions (CDF) for the number of accessible secondary systems based on a circular primary system exclusion zone and a primary system exclusion zone obtained according to the technology of the present disclosure respectively, in the case that a receiver antenna of the primary system is an omnidirectional antenna, i.e., antenna gains in all directions are equal. FIG. 17 is a diagram showing comparison of cumulative distribution functions (CDF) for the number of accessible secondary systems based on a circular primary system exclusion zone and a primary system exclusion zone obtained according to the technology of the present disclosure respectively, in the case that a receiver antenna of the primary system is the directional antenna as shown in FIG. 15 and the maximum antenna gain is 12 dBi.

It can also be seen that, as compared with the conventional circular exclusion zone, the number of accessible secondary systems can be increased with the algorithm for creating the irregular primary system exclusion zone proposed by the present disclosure. Especially in the case that the antenna of the primary system has directivity, the number of the accessible secondary systems is increased more obviously with the algorithm according to the present disclosure.

It should be understood that the above simulation is only exemplary and is not intended to limit the present application.

The technology of the present disclosure is applicable to various products. For example, the electronic apparatus 100-300 each may be realized as any type of server such as a tower server, a rack server, and a blade server. The electronic apparatus 100-300 may be a control module (such as an integrated circuit module including a single die, and a card or a blade that is inserted into a slot of a blade server) mounted on a server.

In addition, the electronic apparatus 400 may be implemented as various types of base station or terminal apparatus respectively. For example, the base station may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals, which will be described below, may each operate as the base station by temporarily or semi-persistently executing a base station function. For example, the terminal apparatus may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus may also be realized as a terminal (that is also referred to as a machine type communication (MTC) terminal) that performs machine-to-machine (M2M) communication. Furthermore, the terminal apparatus may be a radio communication module (such as an integrated circuit module including a single die) mounted on each of the terminals.

[Application Example Regarding a Server]

Figure 18:
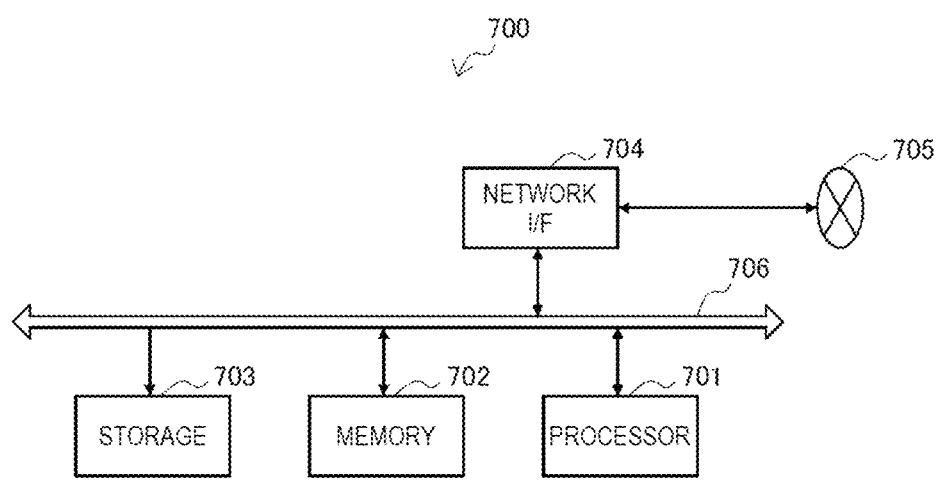
FIG. 18 is a block diagram showing an example of a schematic configuration of a server 700 to which the technology according to the present disclosure may be applied.

FIG. 18 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the sever 700 shown in FIG. 18, the acquiring unit 101 and the determining unit 102 described with reference to FIG. 2 and FIG. 5, the acquiring unit 301 and the determining unit 302 described with reference to FIG. 6 may be implemented by the processor 701. The storage unit 103 described with reference to FIG. 2 may be implemented by the storage apparatus 703. For example, the processor 701 may determine the exclusion zone for the primary system by performing functions of the acquiring unit 101, the determining unit 102 or the acquiring unit 301, the determining unit 302.

[Application Example Regarding a Base Station]

First Application Example

Figure 19:
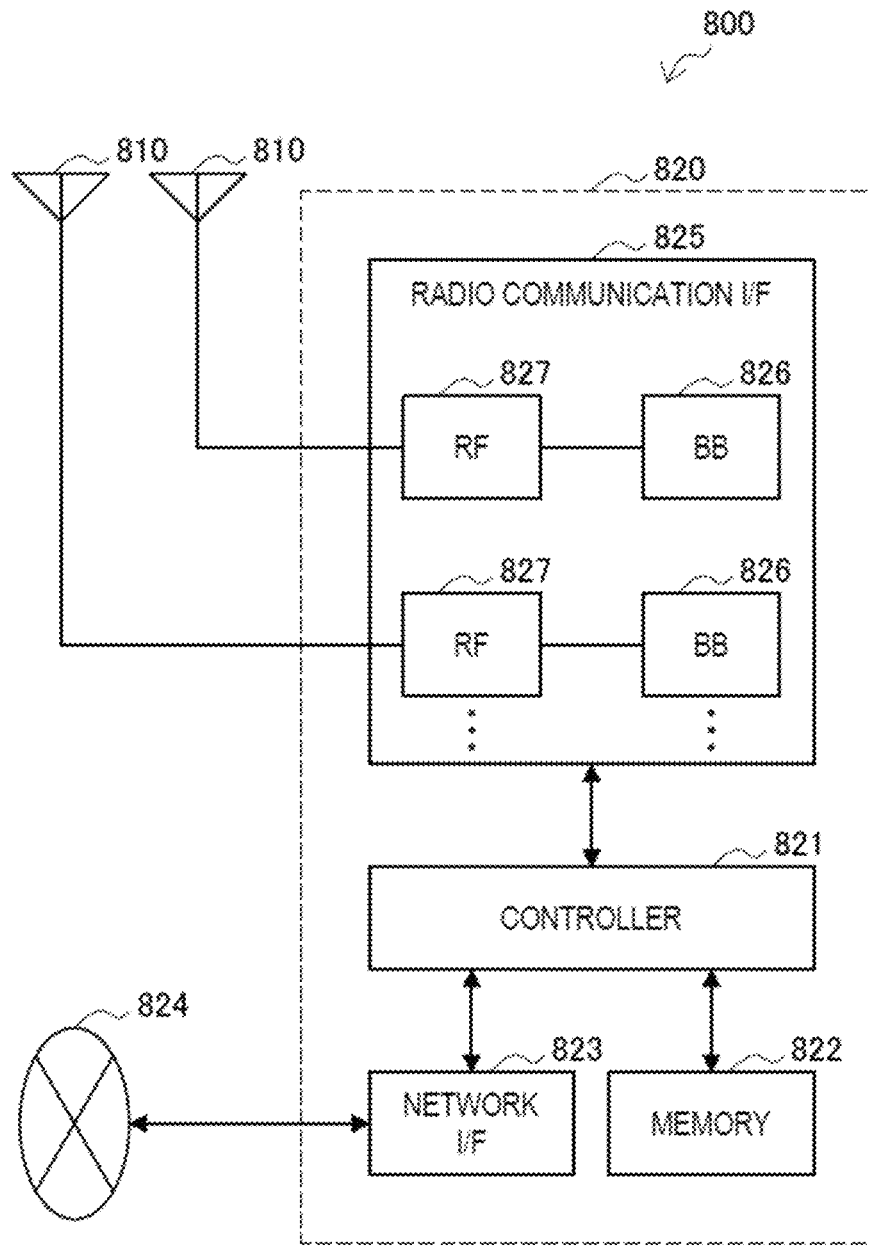
FIG. 19 is a block diagram showing a first example of a schematic configuration of an evolved Node B (eNB) to which the technology according to of the present disclosure may be applied.

FIG. 19 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable. Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 19. For example, the multiple antennas 810 may be compatible with multiple frequency bands used by the eNB 800. Although FIG. 19 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 19. For example, the multiple BB processors 826 may be compatible with multiple frequency bands used by the eNB 800. The radio communication interface 825 may include the multiple RF circuits 827, as illustrated in FIG. 19. For example, the multiple RF circuits 827 may be compatible with multiple antenna elements. Although FIG. 19 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 20:
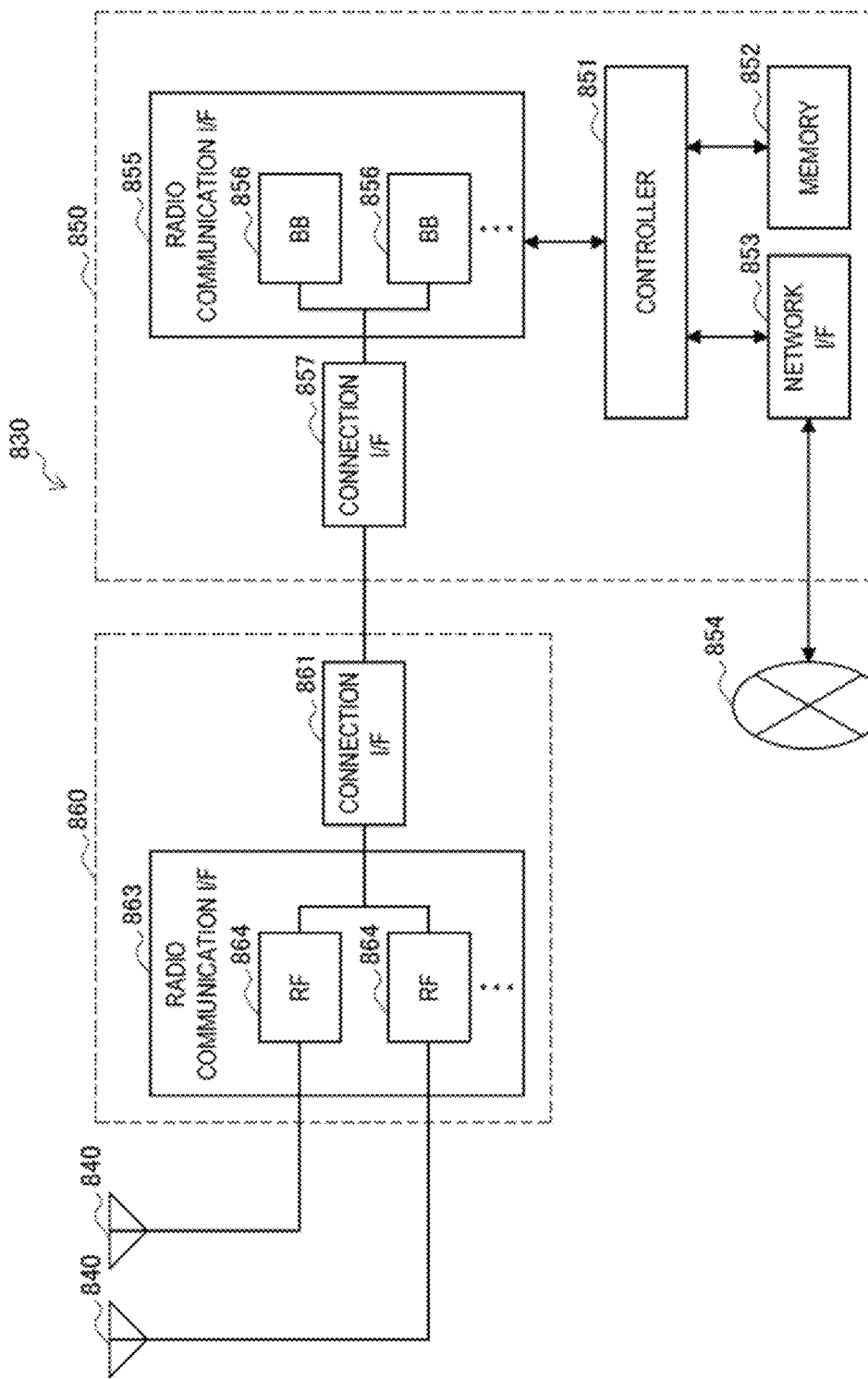
FIG. 20 is a block diagram showing a second example of a schematic configuration of an eNB to which the technology according to the present disclosure may be applied.

FIG. 20 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 20. For example, the multiple antennas 840 may be compatible with multiple frequency bands used by the eNB 830. Although FIG. 20 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 19.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 19, except the BB processor 856 is connected to the RF circuit 864 of the RRH 860 via the connection interface 857. The radio communication interface 855 may include the multiple BB processors 856, as illustrated in FIG. 20. For example, the multiple BB processors 856 may be compatible with multiple frequency bands used by the eNB 830. Although FIG. 20 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 20. For example, the multiple RF circuits 864 may support multiple antenna elements. Although FIG. 20 illustrates the example in which the radio communication interface 863 includes the multiple RF circuits 864, the radio communication interface 863 may also include a single RF circuit 864.

In the eNB 800 and the eNB 830 shown by FIG. 19 and FIG. 20, the transceiving unit 403 described with reference to FIG. 7 may be implemented by the radio communication interface 825 and the radio communication interface 855 and/or the radio communication interface 863. At least a part of functions may be implemented by the controller 821 and the controller 851. The measuring unit 401 and the determining unit 403 described with reference to FIG. 7 may be implemented by the controller 821 and the controller 851. For example, the controller 821 and the controller 851 may measure a signal power of the primary system and determine information on interference amounts to the primary system by performing functions of the measuring unit 401 and the determining unit 402.

[Application Example Regarding a Terminal Apparatus]

First Application Example

Figure 21:
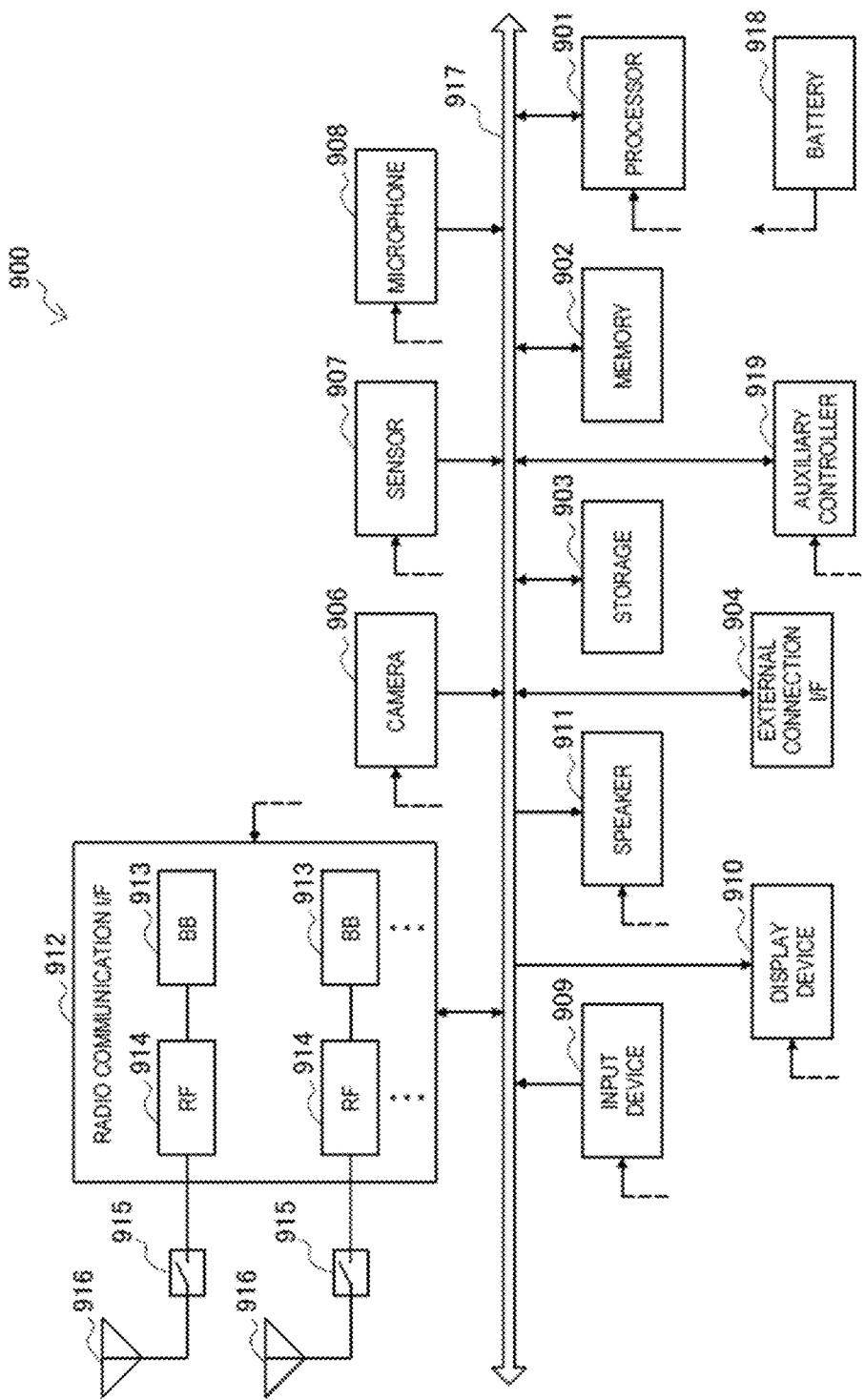
FIG. 21 is a block diagram showing an example of a schematic configuration of a smartphone to which the technology according to the present disclosure may be applied.

FIG. 21 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 21. Although FIG. 21 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 21. Although FIG. 21 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 21 via feeder lines, which are partially shown as dashed lines in the figure. The auxiliary controller 919 operates a minimum necessary function of the smartphone 900, for example, in a sleep mode.

In the smartphone 900 shown in FIG. 21, the transceiving unit 403 described with reference to FIG. 7 may be implemented by the radio communication interface 912. At least a part of functions may be implemented by a processor 901 or an auxiliary controller 919. For example, the processor 901 or the auxiliary controller 919 can measure a signal power of the primary system and determine information on interference amounts to the primary system by performing functions of the measuring unit 401 and the determining unit 402.

Second Application Example

Figure 22:
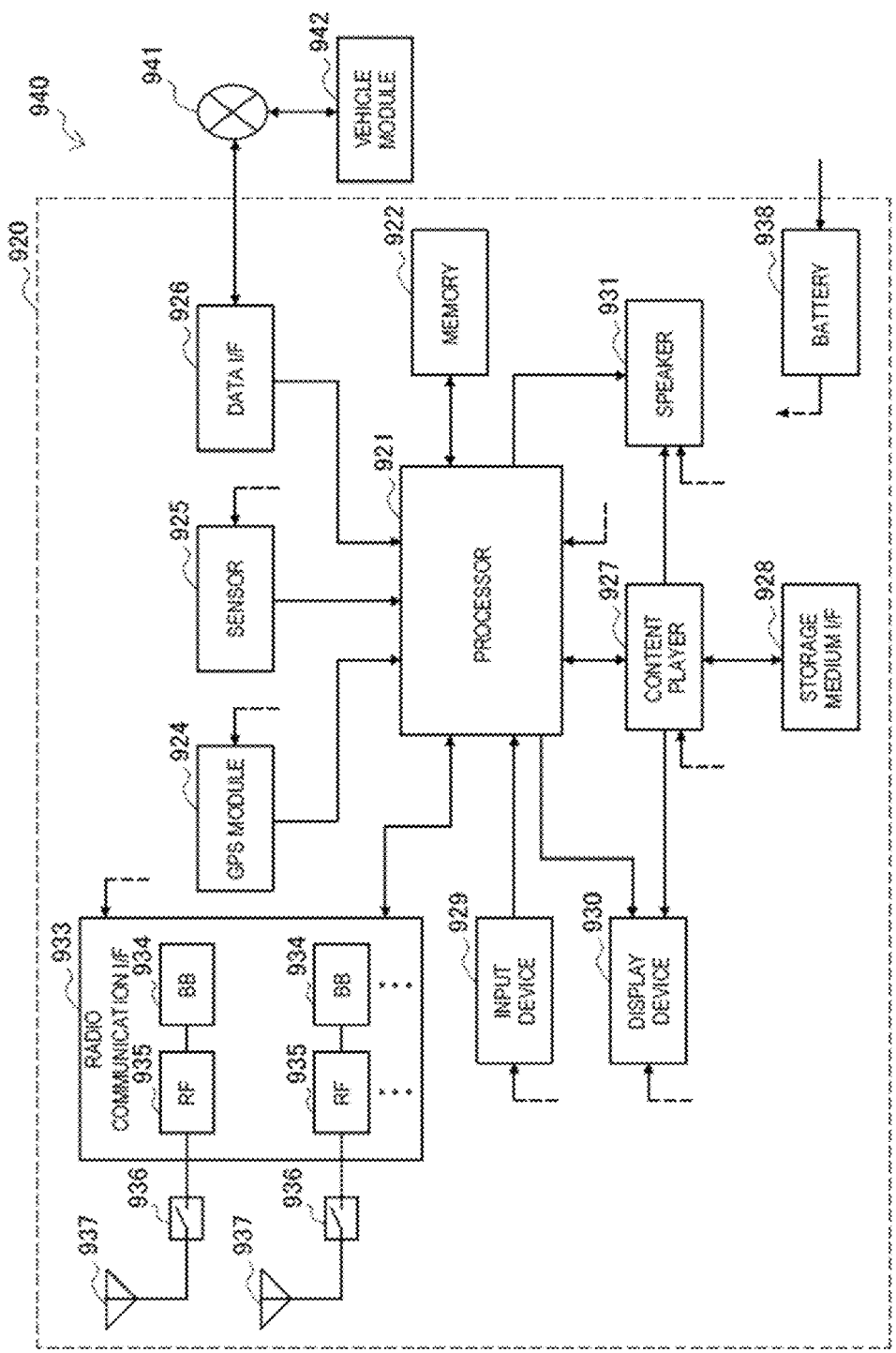
FIG. 22 is a block diagram showing an example of a schematic configuration of an car navigation apparatus to which the technology according to the present disclosure may be applied.

FIG. 22 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 22. Although FIG. 22 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 22. Although FIG. 22 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 22 via feeder lines that are partially shown as dashed lines in the figure. The battery 938 accumulates power supplied form the vehicle.

In the car navigation device 920 shown in FIG. 22, the transceiving unit 403 described with reference to FIG. 7 may be implemented by the radio communication interface 933. At least a part of functions may be implemented by the processor 921. For example, the processor 921 can measure a signal power of the primary system and determine information on interference amounts to primary system by performing functions of the measuring unit 401 and the determining unit 402.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2300 shown in FIG. 23) from a storage medium or network, wherein the computer is capable of implementing various functions when installed with various programs.

Figure 23:
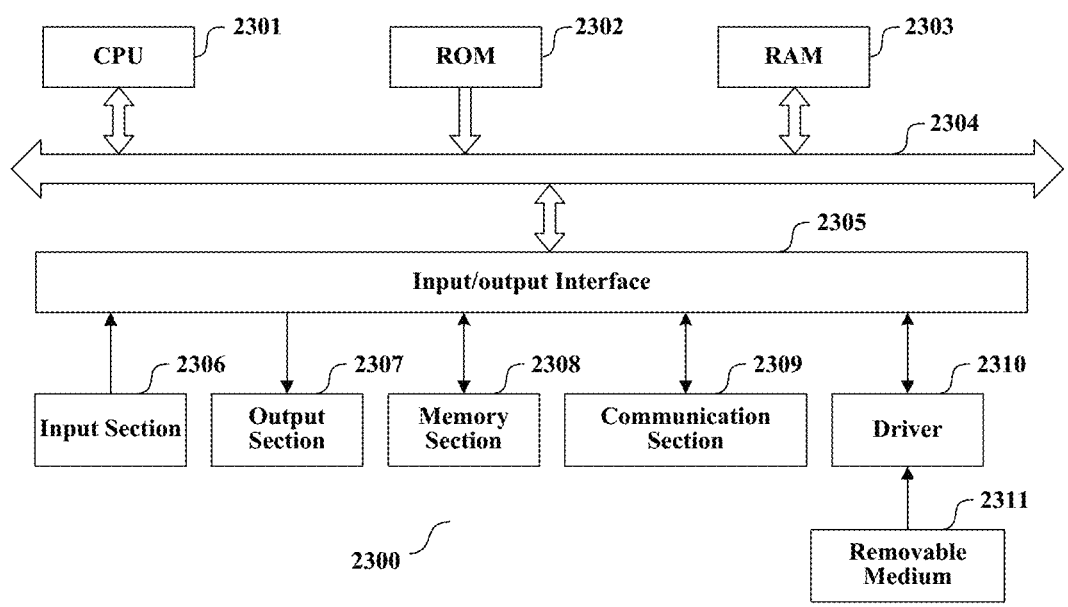
FIG. 23 is an exemplary block diagram illustrating the structure of a general purpose personal computer capable of realizing the method and/or device and/or system according to the embodiments of the present invention.

In FIG. 23, a central processing unit (CPU) 2301 executes various processing according to a program stored in a read-only memory (ROM) 2302 or a program loaded to a random access memory (RAM) 2303 from a memory section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and the like), an output section 2307 (including displays such as a cathode ray tube (CRT), a liquid crystal display (LCD), a loudspeaker and the like), a memory section 2308 (including hard disc and the like), and a communication section 2309 (including a network interface card such as a LAN card, modem and the like). The communication section 2309 performs communication processing via a network such as the Internet. A driver 2310 may also be linked to the input/output interface 2305. If needed, a removable medium 2311, for example, a magnetic disc, an optical disc, a magnetic optical disc, a semiconductor memory and the like, may be installed in the driver 2310, so that the computer program read therefrom is installed in the memory section 2308 as appropriate.

In the case where the foregoing series of processing is achieved by software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 2311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2302 and the memory section 2308 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An electronic apparatus for a spectrum management apparatus, the electronic apparatus comprising:
processing circuitry configured to:
acquire, with respect to a primary system, an interference radiation map representing an interference amount of a secondary system to the primary system at locations in a management region of the spectrum management apparatus;
determine, based on the interference radiation map, an exclusion zone for the primary system, wherein secondary systems located within the exclusion zone are not permitted to use a spectrum used by the primary system, and secondary systems located outside the exclusion zone are permitted to use the spectrum used by the primary system;
correct, according to system parameters of the secondary system, the interference amount at a location corresponding to the secondary system in the interference radiation map; and
transmit information of the corrected interference amount to another spectrum management apparatus.

2. The electronic apparatus according to claim 1, wherein the processing circuitry is further configured to transmit first information of the interference radiation map to the another spectrum management apparatus.

3. The electronic apparatus according to claim 2, wherein the processing circuitry transmits the information and the first information to the another spectrum management apparatus so that the another spectrum management apparatus acquires a boundary of the exclusion zone based the corrected interference amount and the interference radiation map.

4. The electronic apparatus according to claim 1, wherein the processing circuitry is further configured to receive boundary information of a boundary of the exclusion zone from the another spectrum management apparatus.

5. The electronic apparatus according to claim 1, wherein the processing circuitry is further configured to determine, according to a relationship between the corrected interference amount and a boundary of the exclusion zone, whether the secondary system is capable of using the spectrum of the primary system.

6. The electronic apparatus according to claim 5, wherein the processing circuitry is further configured to weight the corrected interference amount to generate an adjusted interference amount, and
the processing circuitry determines whether the secondary system is capable of using the spectrum in the primary system according to the adjusted interference amount.

7. The electronic apparatus according to claim 2, wherein the processing circuitry is further configured to, in a case that there are multiple primary systems using the same spectrum,
add the interference amounts at corresponding locations of the interference radiation map for each primary system to obtain a synthesized interference amount so as to obtain a synthesized interference radiation map, and
transmit the synthesized interference radiation map to the another spectrum management apparatus.

8. The electronic apparatus according to claim 7, wherein the processing circuitry is further configured to
correct the interference amount at locations each corresponding to the secondary system in each interference radiation map, and
transmit information, of the corrected synthesized interference amount and the corrected interference amount of a primary system with a highest interference exclusion zone among the multiple primary systems, to the another spectrum management apparatus.

9. A method for a spectrum management apparatus, the method comprising:
acquiring, by processing circuitry of an electronic apparatus for a spectrum management apparatus and with respect to a primary system, an interference radiation map representing an interference amount of a secondary system to the primary system at locations in a management region of the spectrum management apparatus;
determining, by the processing circuitry and based on the interference radiation map, an exclusion zone for the primary system, wherein secondary systems located within the exclusion zone are not permitted to use a spectrum used by the primary system, and secondary systems located outside the exclusion zone are permitted to use the spectrum used by the primary system;
correcting, by the processing circuitry and according to system parameters of the secondary system, the interference amount at a location corresponding to the secondary system in the interference radiation map; and
transmitting information of the corrected interference amount to another spectrum management apparatus.

10. The method according to claim 9, further comprising transmitting first information of the interference radiation map to the another spectrum management apparatus.

11. The method according to claim 10, wherein the information and the first information are transmitted to the another spectrum management apparatus so that the another spectrum management apparatus acquires a boundary of the exclusion zone based the corrected interference amount and the interference radiation map.

12. The method according to claim 9, further comprising receiving boundary information of a boundary of the exclusion zone from the another spectrum management apparatus.

13. The method according to claim 9, further comprising determining, according to a relationship between the corrected interference amount and a boundary of the exclusion zone, whether the secondary system is capable of using the spectrum of the primary system.

14. The method according to claim 13, further comprising weighting the corrected interference amount to generate an adjusted interference amount, wherein the determining is performed according to the adjusted interference amount.

15. The method according to claim 10, further comprising, in a case that there are multiple primary systems using the same spectrum, adding the interference amounts at corresponding locations of the interference radiation map for each primary system to obtain a synthesized interference amount so as to obtain a synthesized interference radiation map, and transmitting the synthesized interference radiation map to the another spectrum management apparatus.

16. A non-transitory computer readable storage medium storing computer executable instructions which, when executed by processing circuitry of an electronic apparatus for a spectrum management apparatus, cause the processing circuitry to:

acquire, with respect to a primary system, an interference radiation map representing an interference amount of a secondary system to the primary system at locations in a management region of the spectrum management apparatus;

determine, based on the interference radiation map, an exclusion zone for the primary system, wherein secondary systems located within the exclusion zone are not permitted to use a spectrum used by the primary system, and secondary systems located outside the exclusion zone are permitted to use the spectrum used by the primary system;

correct, according to system parameters of the secondary system, the interference amount at a location corresponding to the secondary system in the interference radiation map; and transmit information of the corrected interference amount to another spectrum management apparatus.

17. The non-transitory computer readable storage medium according to claim 16, wherein the processing circuitry is further caused to transmit first information of the interference radiation map to the another spectrum management apparatus.

18. The non-transitory computer readable storage medium according to claim 17, wherein the information and the first information are transmitted to the another spectrum management apparatus so that the another spectrum management apparatus acquires a boundary of the exclusion zone based the corrected interference amount and the interference radiation map.

19. The non-transitory computer readable storage medium according to claim 16, wherein the processing circuitry is further caused to receive boundary information of a boundary of the exclusion zone from the another spectrum management apparatus.

20. The non-transitory computer readable storage medium according to claim 16, wherein the processing circuitry is further caused to determine, according to a relationship between the corrected interference amount and a boundary of the exclusion zone, whether the secondary system is capable of using the spectrum of the primary system.

* * * * *